United States Patent
Roberts et al.

(10) Patent No.: US 11,543,519 B2
(45) Date of Patent: Jan. 3, 2023

(54) COLLISION WARNING USING ULTRA WIDE BAND RADAR

(71) Applicant: Intel Corporation, Santa Clara, CA (US)

(72) Inventors: Richard D. Roberts, Hillsboro, OR (US); Melissa Cowan, Hillsboro, OR (US); Saiveena Kesaraju, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 16/456,243

(22) Filed: Jun. 28, 2019

(65) Prior Publication Data

US 2020/0116856 A1 Apr. 16, 2020

(51) Int. Cl.
*G01S 13/933* (2020.01)
*G08G 5/00* (2006.01)
(Continued)

(52) U.S. Cl.
CPC .......... *G01S 13/933* (2020.01); *B64C 39/024* (2013.01); *G05D 1/1064* (2019.05);
(Continued)

(58) Field of Classification Search
CPC ..... H04L 47/27; H04L 1/0002; H04L 1/0009; H04L 1/0041; H04L 1/0076; H04L 1/1858; H04L 5/0055; H04L 43/0829; H04L 43/0864; H04L 45/22; H04L 45/24; H04L 45/52; H04L 45/74; H04L 47/127; H04L 47/16; H04L 47/20; H04L 47/263; H04L 47/283; H04L 47/30; H04L 49/351; H04L 49/552; H04L 49/90; H04L 67/01; H04L 67/04; H04L 67/141; H04L 67/56; H04L 69/161; H04L 69/40; H04L 2001/0097;
(Continued)

(56) References Cited

U.S. PATENT DOCUMENTS

2003/0209893 A1* 11/2003 Breed ............... B60R 21/01536
701/45
2004/0129478 A1* 7/2004 Breed ................... B60R 21/013
180/273
(Continued)

FOREIGN PATENT DOCUMENTS

DE 102020114277 A1 12/2020

*Primary Examiner* — Rami Khatib
*Assistant Examiner* — Shahira Baajour
(74) *Attorney, Agent, or Firm* — Schwegman Lundberg & Woessner, P.A.

(57) ABSTRACT

A method of collision warning using broad antenna pattern ultra-wide band (UWB) radar includes emitting a first radar ping from a broad beam UWB antenna and receiving a first return signal identifying an object. A first hemisphere with a first radius is determined for the object. A second ping, second return and second hemisphere is defined for the object. At the intersection of the hemispheres, an object ring is defined. The radius of the object ring is compared with the radius of a collision cylinder (e.g., representing a safe distance around a system or device, such as a drone). The object may be identified as posing a collision threat when the radius of the object ring is smaller than the radius of the collision cylinder.

25 Claims, 17 Drawing Sheets

(51) Int. Cl.
  *G05D 1/10* (2006.01)
  *B64C 39/02* (2006.01)
  *G08G 5/04* (2006.01)

(52) U.S. Cl.
  CPC ......... *G08G 5/0039* (2013.01); *G08G 5/0069* (2013.01); *G08G 5/045* (2013.01); *B64C 2201/145* (2013.01)

(58) Field of Classification Search
  CPC .. H04L 1/1819; H04W 28/04; H04W 72/1257
  See application file for complete search history.

(56) References Cited

U.S. PATENT DOCUMENTS

| | | | | |
|---|---|---|---|---|
| 2006/0028374 A1* | 2/2006 | Fullerton | ................. | F41G 5/08 342/67 |
| 2022/0116542 A1* | 4/2022 | Kim | ........................ | H01Q 5/25 |

* cited by examiner

COLLISION WARNING USING ULTRA WIDE BAND RADAR

BACKGROUND

Drones are being used in a number of different capacities, such as carrying packages for deliveries to homes or businesses, carrying food or other supplies to remote locations, geographic mapping, surveillance, filming or the like. Drones may also be used in military or law enforcement capacities, such as air strikes, bomb detection, or monitoring large crowds.

Radar is increasingly being used for a variety of applications, such as navigation of drones, autonomous driving vehicles, robots, or the like. Modern radar systems may utilize, depending on the application, any one of a number of different types of antennas and/or types of radar beams (e.g., narrow band or wide band). In general, radar beams are transmitted either as a continuous wave, in which the radar transmitter is emitting a continuous, uninterrupted signal, as long as the transmitter is operating, or a pulsed wave in which the radar beam is transmitted for a set time duration after which transmission of the beam stops.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for implementing collision warning using broad antenna pattern ultra-wide beam (UWB) are described herein. The systems and methods use multiple radar pings from an UWB antenna to determine whether an object is within a defined collision cylinder, for example, without requiring the exact location of the object to be known.

In an example, a system uses a UWB antenna to send multiple radar pings. The UWB antenna pattern may be very broad, for example, covering plus or minus 60 degrees off a boresight of a drone. The UWB can be used to resolve objects directly ahead of the drone. This may allow for a smaller, lighter antenna to be mounted on the drone which, in turn, may reduce the cost of operating the drone as well as the amount of power required to operate the drone.

As described herein, a collision cylinder includes an area of space extending forward ahead of a drone, optionally commensurate to the dimensions of the drone or larger (e.g., including a buffer zone). The volume of space may be concentric with the drone's intended or predetermined flight path, current trajectory, or based on a current velocity of the drone. A collision may be determined to be imminent when an object is determined to be within the collision cylinder. An end of the cylinder may include a collision disk, the diameter of which may be as wide as the drone or larger (e.g., including a buffer zone).

By sending multiple pings from a UWB radar while a drone is moving, multiple hemispheres of possible object locations may be defined. A wideband antenna may define a single hemisphere corresponding to a single ping. This is in contrast to, for example, an omnidirectional antenna which may define multiple spheres with each ping. The area in which the hemispheres overlap creates an object ring at a determinable range. When the object ring has a radius greater than the dimensions of the drone or radius of the collision disk, then no collision will occur. When the radius of the object ring is smaller than that of the collision disk or the dimensions of the drone, a collision may be imminent. In an example, the intersection of the hemispheres may form a disk in the shape of a circle. In another example the intersection of the hemispheres may be oblong, resulting in a disk having the shape of an ellipse.

Figure 1:
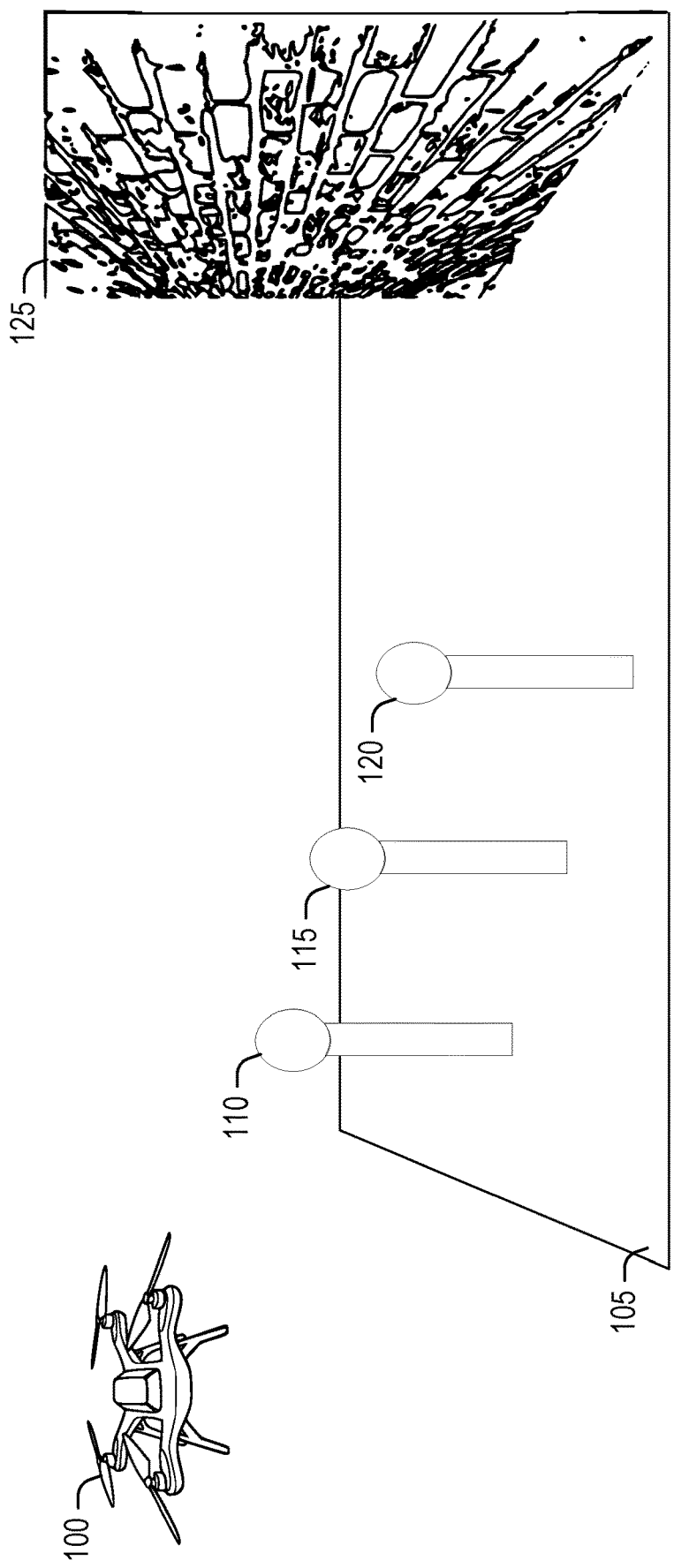
FIG. 1 illustrates a schematic diagram showing a drone and potential collision objects according to some embodiments.

FIG. 1 illustrates a schematic diagram showing a drone 100 and potential collision objects 110, 115, and 120, according to some embodiments. In the example shown in FIG. 1, a drone 100 is flying above the ground 105. In this example, potential collision objects include objects 110, 115, and 120 fixed to the ground 105. Such objects may include telephone poles, light posts, or such similar objects. Another potential collision object may include a wall 125 such as the side of a building. While FIG. 1 illustrates examples of potential collision objects, other potential collision objects may include objects that are not fixed to the ground 105, such as by way of example, birds or other flying objects. Other objects which are fixed to the ground may include trees, billboards or such similar objects. In an example, objects may be natural or man-made, and may be fixed to the ground 105, or a structure, or free to move about the air. In the example of FIG. 1, the objects 110, 115, and 120 are far enough apart to be range resolvable and have enough reflectivity to provide sufficient signal-to-noise ratio (SNR) to distinguish the objects from clutter.

Figure 2A:
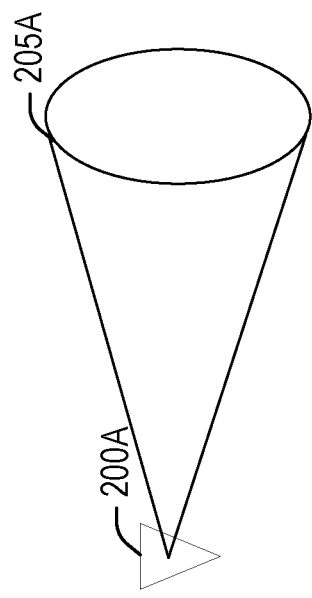
FIGS. 2A and 2B illustrate consecutive radar pings from an antenna using a beam that is too narrow to accommodate both pings, according to some embodiments.
Figure 2B:
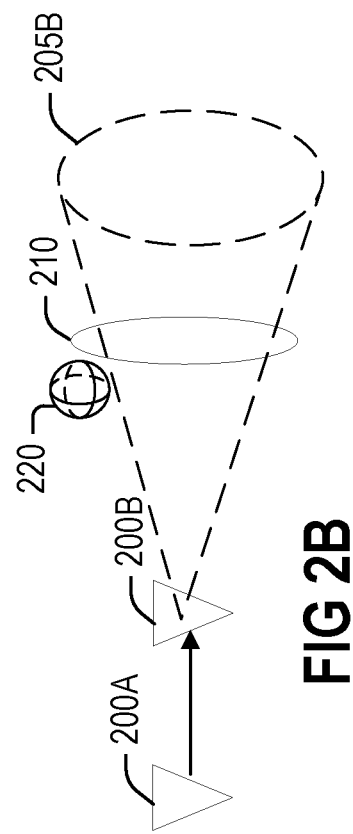

FIGS. 2A and 2B illustrate consecutive radar pings from an antenna using a beam that is too narrow to accommodate both pings, according to some embodiments. In the example of FIG. 2A, the antenna (e.g., a narrow beam antenna) at a first position 200A, emits a first ping resulting in a cone shaped radar beam 205A. As shown in FIG. 2B, as the antenna moves to a new position 200B, the antenna emits a second ping, resulting in a second cone shape beam 205B. In this example, because of the movement of the antenna from position 200A to position 200B (which may occur via a moving drone upon which the antenna is attached), the second ping may not be wide enough to fill a collision disk 210. In this example, an object 220 may be within the collision disk 210, and as such represent a potential risk of collision to the drone. The second radar ping and resulting beam 205B may not resolve the object, such as an object 220, located outside the width of the beam 205B, but within the radius of the collision disk 210.

FIGS. 3-6 illustrate schematic diagrams of a radar ping from an ultra-wide band (UWB) antenna, according to some embodiments.

Figure 3:
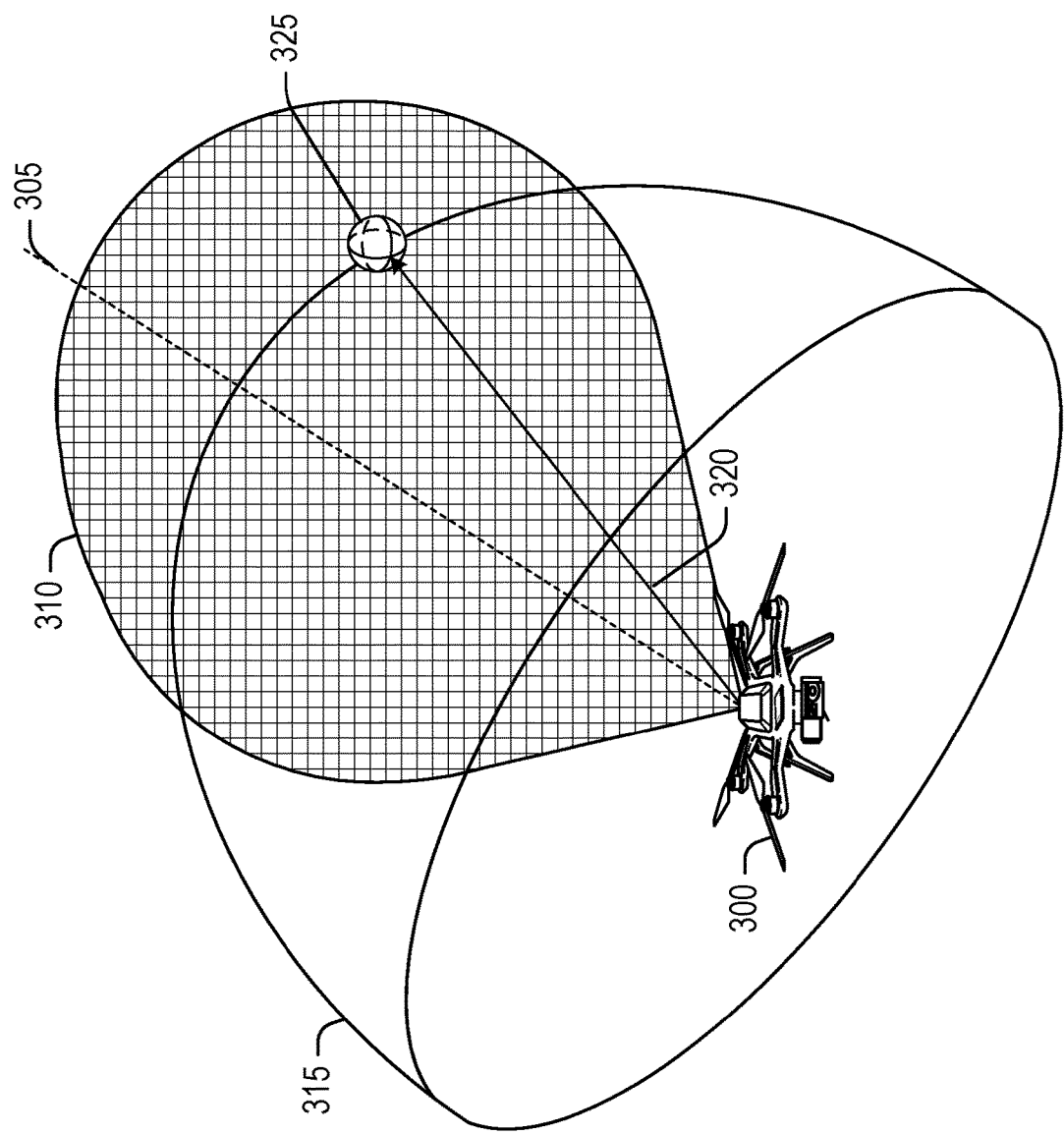
FIGS. 3-6 illustrate schematic diagrams of a radar ping from an ultra-wide band (UWB) antenna, according to some embodiments.

FIG. 3 illustrates a radar ping from a UWB antenna and a detected object on the surface of a hemisphere. In the example shown in FIG. 3, a drone 300 travels along a trajectory 305 and emits a first radar ping from a UWB antenna coupled to the drone 300. This results in a radar beam 310 extending in a direction away from the drone 300, such as forward, in front of the drone 300. When an object 325 is detected, such as through a radar return to a receiver coupled to the drone 300 from the first radar ping, a first hemisphere 315 with a first radius 320 may be defined. The object 325 may lie on a surface of the defined first hemisphere 315, at a distance equal to the length of the first radius 320 of the first hemisphere 315.

In an example, a UWB antenna attached to the drone 300 may act as both a transmitter and receiver, with the capability to transmit the radar ping and receive a radar return from the object 325. In another example, the receiver may be located separately from the UWB antenna. In this example the receiver may be located on the drone 300, or alternately, may be located separately from the drone. In an example, the UWB radar operates in accordance with a standard, such as the U.S. Federal Ultra-Wideband Operation standard codified in 47 C.F.R. 15, Subpart F.

Figure 4:
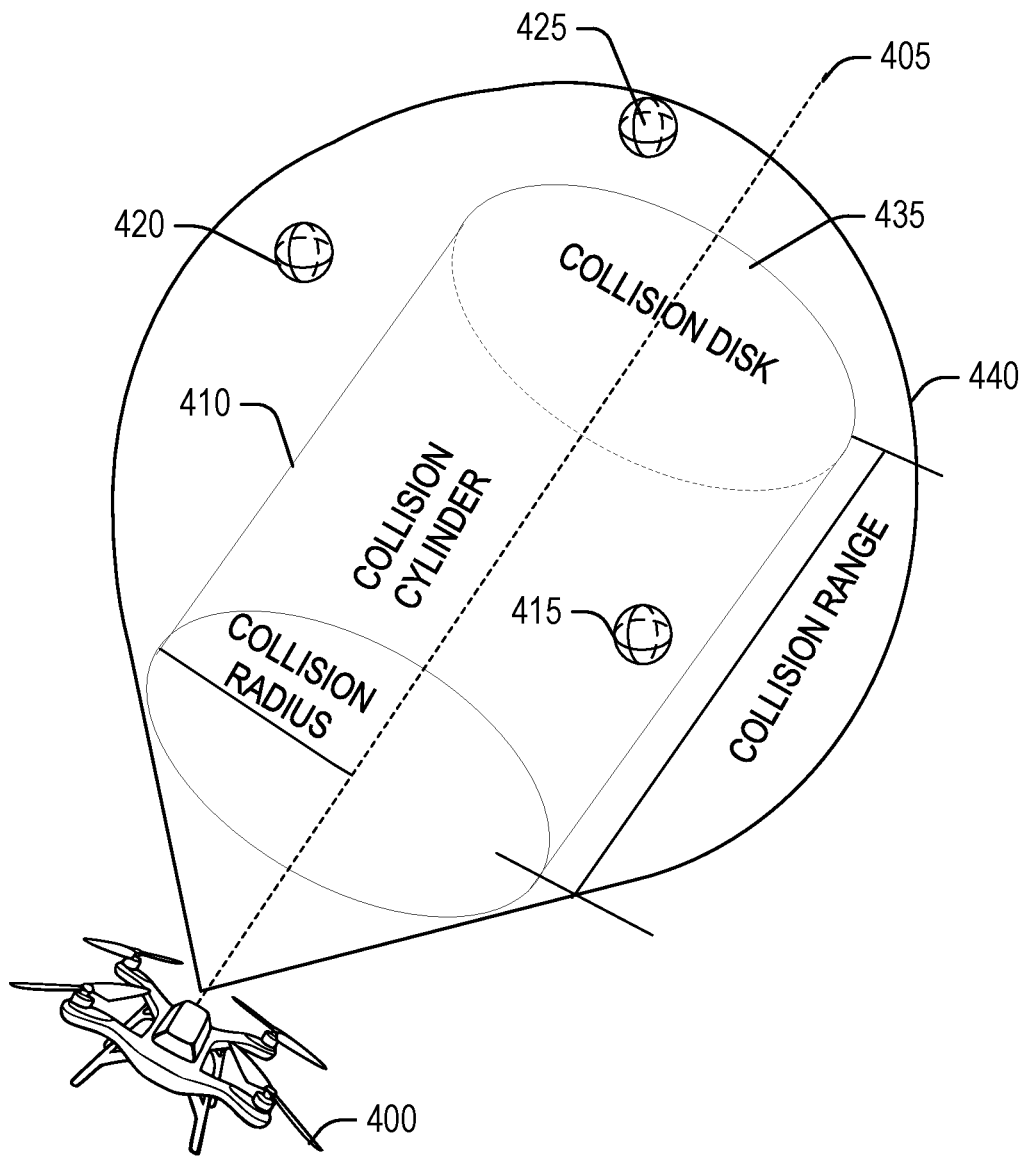

FIG. 4 illustrates a radar ping from a UWB antenna with a defined collision cylinder 410 including a collision disk 435 within the beam, according to some embodiments. In the example shown in FIG. 4, a collision cylinder 410 may be defined as extending outward from a drone 400, in a direction (e.g. in a direction of travel of the drone 400). In this example the collision cylinder 410 is commensurate with the dimensions of the drone 400. For example, the radius of the cylinder 410, may be equal to half the width of the drone 400. In this example, the diameter of the collision cylinder 410 may be equal to the total width of the drone 400 and may define a collision disk 435. In other examples, the collision cylinder 410 may be greater than the dimensions of the drone 400, for example to provide a buffer area, to change the direction or heading of the drone, to provide a wind clearance, or the like.

The length of the collision cylinder 410 may define a collision range, which may vary depending on the speed the drone 400 is traveling along the trajectory 405, a preplanned route, wind, time needed for avoidance, or the like. For example, as the drone 400 increases in speed, the collision range may be increased for a static time needed for avoidance, resulting in a collision cylinder 410 having a longer length. In the example shown in FIG. 4, the collision cylinder 410 may be fully encompassed within the range of the radar beam 440, emitted from a UWB antenna mounted on the drone 400.

In this example, radar returns from the UWB antenna beam 440 may resolve objects 415, 420, and 425. When an object, such as object 415 is resolved within the collision cylinder 410, an imminent collision may be determined. In such an example, a warning may be triggered as a result of the imminent collision determination. In an example, the drone 400 may be remotely operated. In this example, a warning (e.g. an audible or visual warning) may be triggered at the location of the remote control to warn an operator of the drone 400 to maneuver the drone 400 (e.g. change direction) to avoid a collision with the object 415 that is within the collision cylinder 410. In another example, the drone 400 may be operated autonomously. In this example a warning may trigger processing circuitry to maneuver the drone 400 to avoid a collision with the object 415 within the collision cylinder 410.

In another example, the radar returns may resolve objects 420 and 425, which are outside the collision cylinder 410. In this example, the objects 420 and 425, which are outside the collision cylinder 410, may be determined to not pose an imminent threat of collision. In this example, because objects 420 and 425 are not within the collision cylinder 410, no alert may be issued for those objects. In an example, the collision cylinder 410 includes a height, along a trajectory of a flight path of the system, based on a collision range of the system, the height determined based on a velocity of the system. In an example, the diameter of the collision cylinder 410 is determined based on the width of the drone 400.

Figure 5:
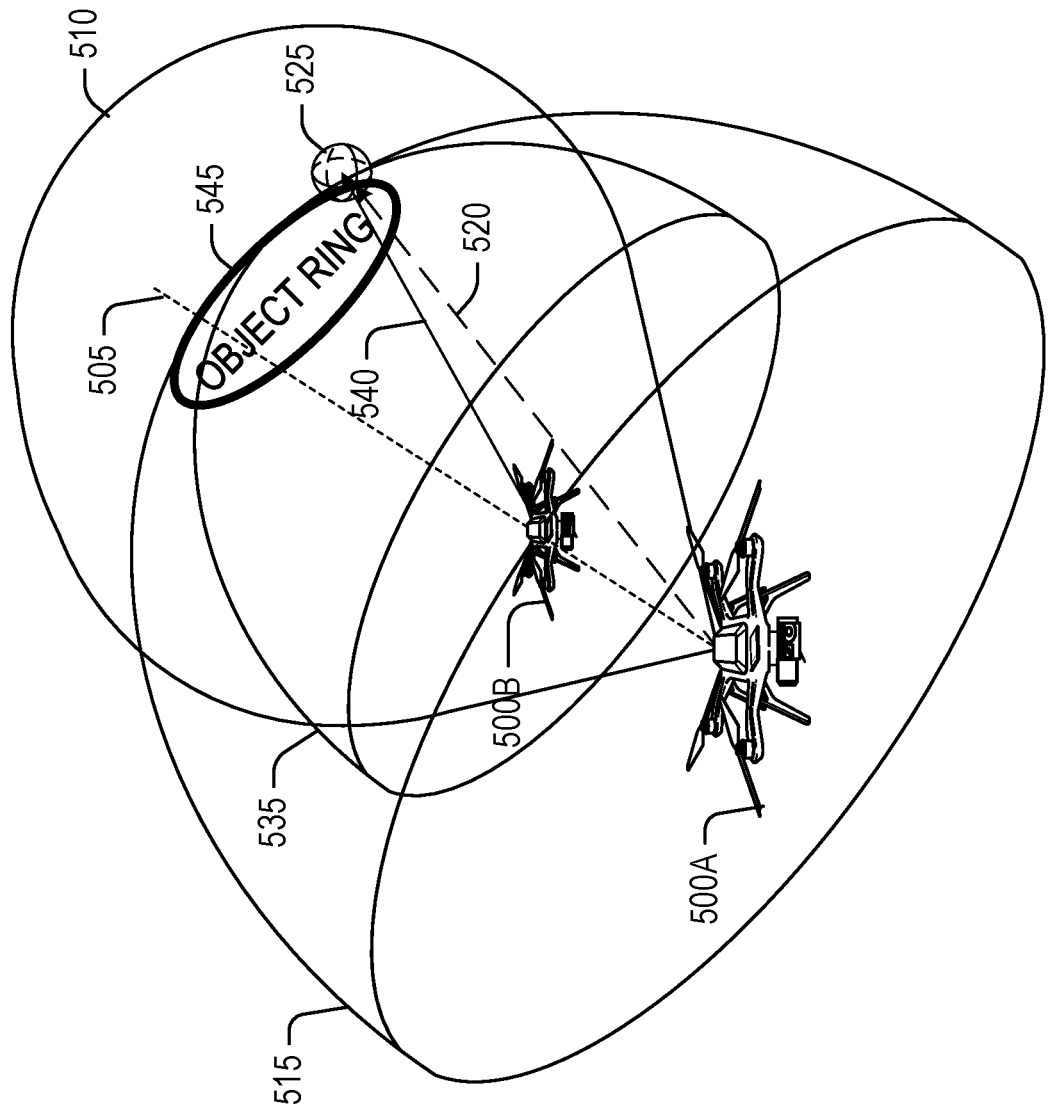

FIG. 5 illustrates two hemispheres 515, 535 defined from two successive radar pings taken while the drone is moving, with an object ring 545 defined at the overlap in the hemispheres 515, 535, according to some embodiments. In the example shown in FIG. 5, a drone is located at a first position 500A and a first radar ping 510 from a UWB antenna located on the drone is emitted from the first position 500A. The first radar ping 510 results in a radar return resolving at least a portion of an object 525. From this return, a first hemisphere 515, with a first radius 520 are determined. At a later period of time the drone has moved a distance along the trajectory 505 to a second position 500B. The UWB antenna emits a second radar ping (not shown to increase clarity) resulting in a second radar return resolving at least a portion of the object 525. From this second radar return, a second hemisphere 535 and a second radius 540 may be determined.

A processor (e.g., of the drone or a remote computing device) may determine an overlap of the first hemisphere 515 defined from the first radar return from the object 525, and the second hemisphere 535 defined from the second radar return from the object 525. The overlap may include an object disk 545. In the example shown in FIG. 5, the size of the second hemisphere 535 may be different (e.g. smaller) than the size of the first hemisphere 515 when the object 525 is closer to the drone at the second position 500B than the first position 500A. The sizes of the first hemisphere 515 and the second hemisphere 535 relative to each other may depend on the speed of the drone, as well as the time and the distance between the first and second radar pings, and any movement of the object 525. As a result, the area of the object ring 545 may depend on the size of the first hemisphere 515 and the size of the second hemisphere 535, as well as their relative locations. The object ring 545 may have a circular shape (e.g. an oval) and a radius.

Figure 6:
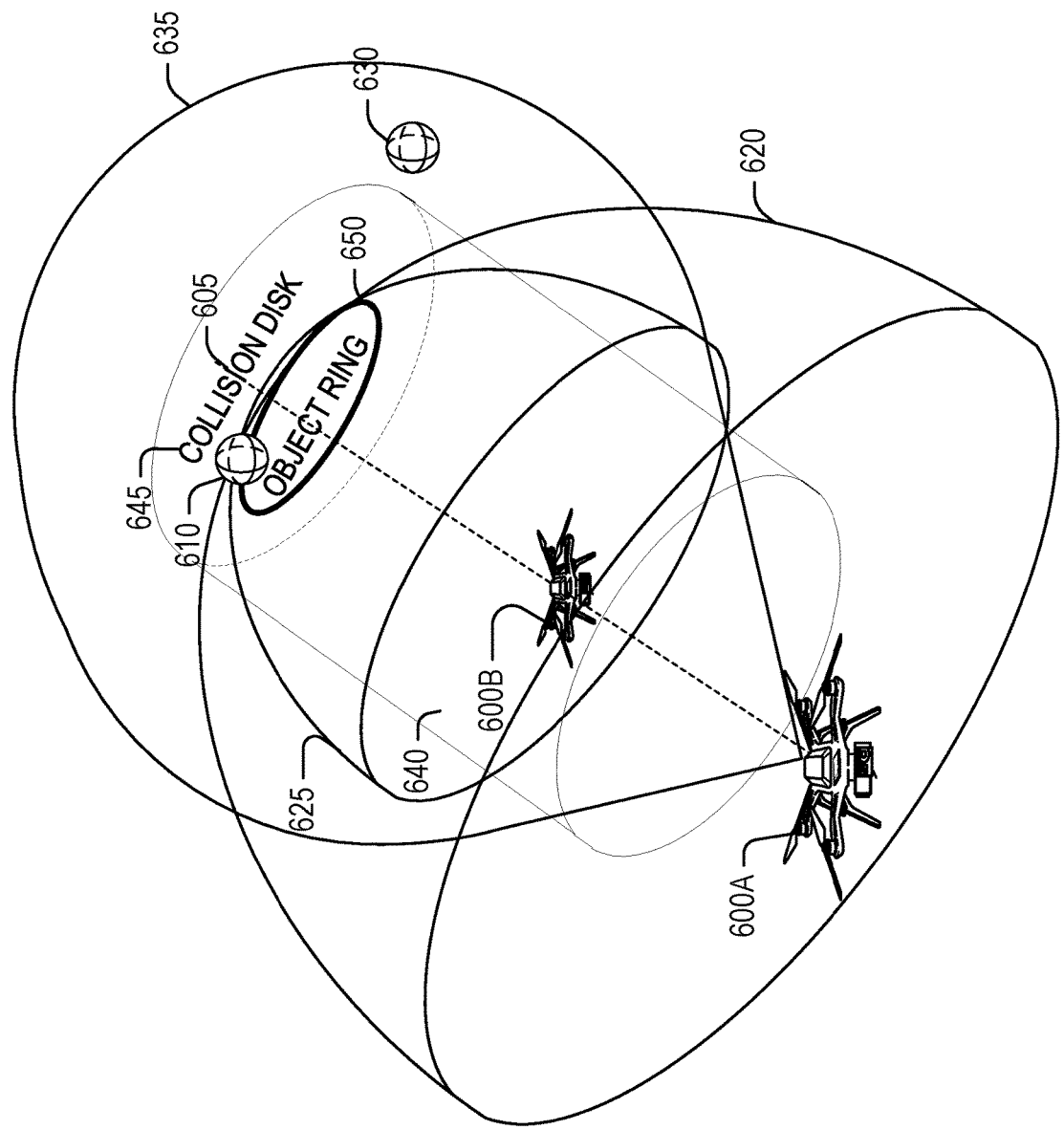

FIG. 6 illustrates a scenario when an object ring 650 lies inside a defined collision cylinder 640, according to some embodiments. In the example shown in FIG. 6, a drone moves along a trajectory 605 from a first position 600A to a second position 600B. When the drone is in position 600A, a first radar ping from a UWB antenna mounted on the drone may be emitted, resulting in a UWB radar beam 635. A collision cylinder 640 with a first end and a second end is defined extending in a direction (e.g. along the trajectory 605) from the drone. As described above with respect to FIG. 4, the collision cylinder 640 may have a collision disk 645, and a collision radius (not shown).

In the example of FIG. 6, a first radar return from the first radar ping may not resolve objects 610 and 630 because they are at the same radius of a resulting first hemisphere 620. This may be due, for example, to range aliasing. After a period of time, the drone may move from position 600A to position 600B along the trajectory 605 and may emit a second radar ping from the UWB antenna mounted on the drone. A second radar return from the second radar ping may resolve at least a portion of one of the objects 610 and 630. A second hemisphere 625 may be determined for the object 610.

In an example, an object ring 650 for the object 610 may be determined. The object ring 650 represents the intersection of the first and second hemispheres 620 and 625. The collision cylinder 640 includes a collision disk 645 at a distal end (e.g., at an end of the collision cylinder 640 farthest away from the drone). The collision disk 645 may be centered around the trajectory 605, in an example. The collision disk 645 may be a particular distance away from the drone (e.g., based on speed or maneuverability of the drone).

The object ring 650 and the collision disk 645 may be compared to determine whether a radius of the object ring 650 is larger or smaller than a radius of the collision disk 645. In an example, when the radius of the object ring 650 is smaller than the radius of the collision disk 645, an alert may be issued to warn of an imminent collision of the drone with the object 610. When the radius of the object ring 650 is greater than the radius of the collision disk 645, no collision may be imminent for the drone with the object 610. The radius of the object ring 650 represents a set of potential locations for the object 610, because the object 610 is determined to be located on the circumference of the object ring 650 based on the UWB radar pings. When the radius of the object ring 650 is larger than the collision disk radius, the object 610 is located outside a collision area of the drone. When the radius of the object ring 650 is smaller than the collision disk radius, the object 610 is within a collision volume of the drone's collision cylinder.

In this example, a second object ring (not shown) may be determined corresponding to object 630. The radius of an object ring corresponding to object 630 may be larger than the radius of the collision disk 645, and as such, may not identify object 630 as presenting an imminent collision threat. In an example in which only object 630 is present, the drone 600 may continue along the trajectory 605, and may not be required to be maneuvered to avoid the object 630. In another example in which both objects 610 and 630 are present, the drone may have to be maneuvered to avoid collision with object 610. While object 630 may not initially trigger the warning, or cause the drone 600 to evasively maneuver as described for FIG. 4, the position of object 630 may not be ignored because the drone 600 may be required to maneuver such to both avoid the imminent collision threat presented by object 610, but also not place the drone 600 on a course which may put it in the path of object 630 and thus trigger another warning of an imminent collision.

Figure 7B:
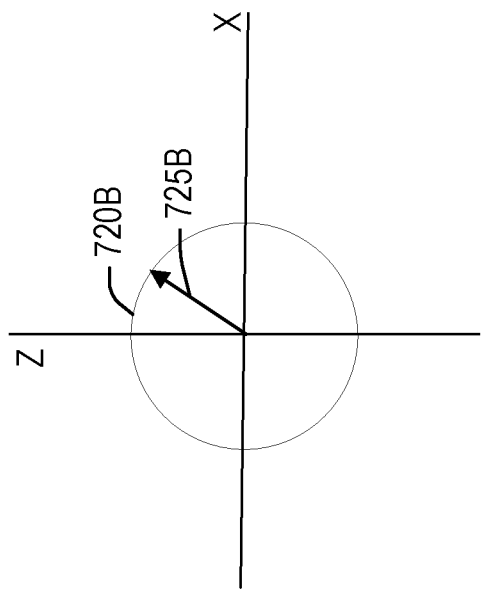
FIGS. 7A and 7B illustrate an object ring, according to some embodiments.
Figure 7A:
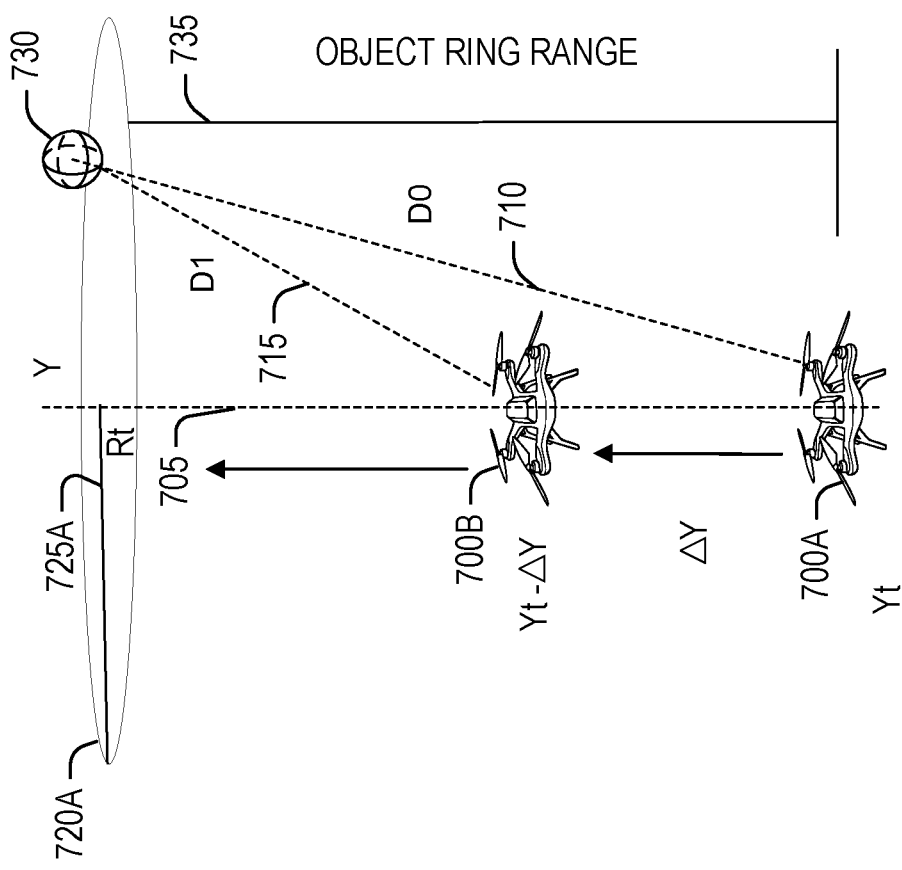

FIGS. 7A and 7B illustrate an object ring, according to some embodiments. In FIG. 7A a drone, travels along a Y trajectory 705A. An object 730 is located a distance (e.g., an object ring range) 735 away from the drone on a defined disk 720A (e.g., a circle) having a radius 725A and centered on the Y trajectory 705. When the drone is at position 700A, a first ping may be emitted from a UWB antenna located on the drone. A radar return from the first ping may define a first range measurement 710 to the object 730. In an example, the first ping may define the X-Z coordinate system shown in FIG. 7B.

As the drone moves a distance ΔY along the Y trajectory 705 from position 700A to position 700B, the drone may emit a second radar ping, and receive a second radar return from object 730 which may define a second range measurement 715. From the first range measurement 710 and the second measurement 715, the object disk range (not shown) and the radius (not shown) may be determined. FIG. 7B illustrates an alternate (top down) view of the object ring 720B, having a radius 725B, centered on an X, Y, Z axis.

In an example, the first position 700A of the drone may be defined as Yt and the second position 700B may be defined as Yt-ΔY. Similarly, the first range 710 may be defined as D0 and the second range 715 may be defined D1. Further, when the radius 725A of the object ring 720A is defined as Rt, then the radius 725A and the object ring range 735 may be determined using Eqs. 1-6 shown below. In calculating $R_t$ it may be assumed that ΔY is a known path of the drone.

$$R_t^2 = X_t^2 + Z_t^2 \qquad \text{Eq. 1}$$

$$D0^2 = X_t^2 + Y_t^2 + Z_t^2 = R_t^2 + Y_t^2 \qquad \text{Eq. 2}$$

$$D1^2 = X_t^2 + (Y_t - \Delta Y)^2 + Z_t^2 = \qquad \text{Eq. 3}$$
$$X_t^2 + Y_t^2 - 2Y_t\Delta Y + \Delta Y^2 + Z_t^2 = R_t^2 + Y_t^2 - 2Y_t\Delta Y + \Delta Y^2$$

$$D0^2 - D1^2 = 2Y_t\Delta Y - \Delta Y^2 \qquad \text{Eq. 4}$$

$$Y_t = \frac{Do^2 - D1^2 + \Delta Y^2}{2\Delta Y} \qquad \text{Eq. 5}$$

$$R_t = \sqrt{D0^2 - Yt^2} \qquad \text{Eq. 6}$$

In this example, the object radius 725A may be defined as the square root of the first range measurement 710 and the first position 700A of the drone. When the object radius 725A as calculated above is greater than the radius of a collision cylinder (for example, as described with respect to FIG. 4 and FIG. 6 above), then a collision with the object 730 may be determined to not be imminent. In an example where the object radius 725A as calculated above is equal to the radius of a collision cylinder, a "decision threshold" in which a decision to initiate a warning (e.g., such as a warning as described with respect to FIG. 4 above) may be reached. In an example where the radius of the object ring 725A as calculated above is smaller than the radius of a collision cylinder, a collision with the object 730 may be determined to be imminent.

Figure 8:
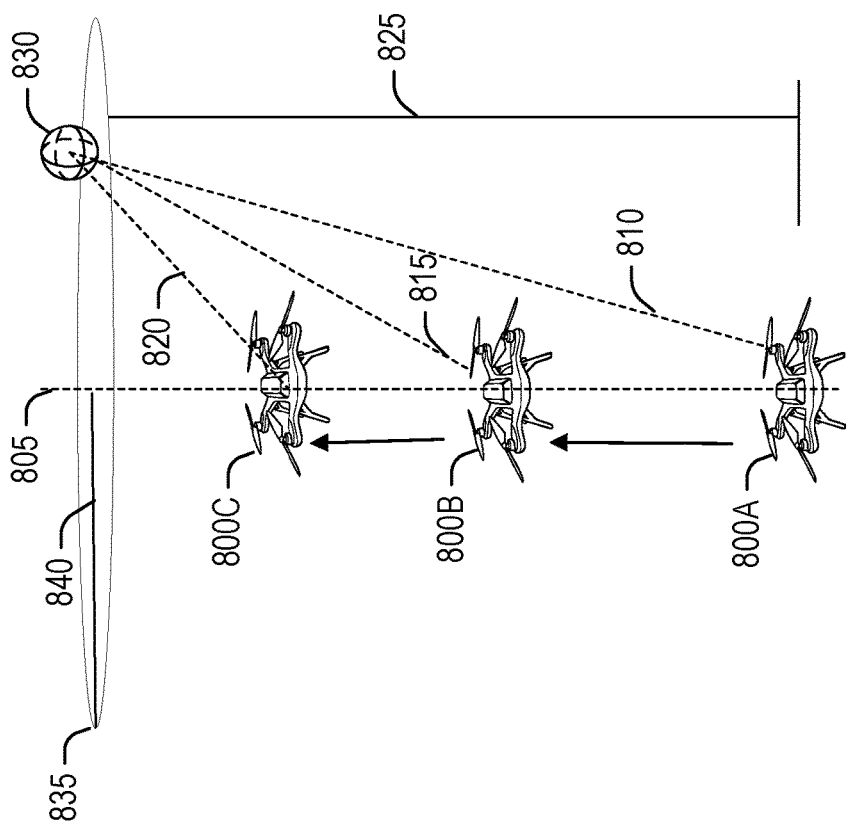
FIG. 8 illustrates a diagram showing multiple pings from a drone, according to some embodiments.

FIG. 8 illustrates a diagram showing multiple pings from a drone. In the example of FIG. 8, the drone moves along the trajectory 805 (for example, as described with respect to FIG. 7 above). In this example, the drone begins at position 800A which represents an initial position along the Y trajectory 805, or Yt. In an example, the drone is traveling at a velocity V1 (e.g., which may be constant), and after a first period of time, t*V1, the drone may move a first distance ΔY to position 800B. After a second period of time, t*V1 (or at another velocity or period of time), the drone may move a second distance ΔY (or another distance) to location 800C. As discussed above with respect to FIG. 7, at each position the drone 800 may emit a radar ping from the UWB antenna, resulting in a first range measurement 810, a second range measurement 815, and a third range measurement 820, to an object 830. The object 830 may be located a distance (object ring range) 825 away from the initial position 800A of the drone on a disk 835 (e.g. a circle) having a radius 840 and centered on the Y trajectory 805. The disk 835 may be determined as described herein. Table 1 below describes range measurements obtained (D0 and D1) at three drone positions (Yt–dy) at a defined object location (X=1.5 Z=1.75).

TABLE 1

| Range Measurements | | | | | | | |
|---|---|---|---|---|---|---|---|
| Object Location | | | Object Range | | | Slant Range | |
| X | Z | Rt | Yt | ΔY | Yt − ΔY | D0 | D1 |
| 1.5 | 1.75 | 2.304886 | 5 | 0.1 | 4.9 | 5.5056789 | 5.4150254 |
| 1.5 | 1.75 | 2.304886 | 4.9 | 0.1 | 4.8 | 5.4150254 | 5.3247066 |
| 1.5 | 1.75 | 2.304886 | 4.8 | 0.1 | 4.7 | 5.3247066 | 5.2347397 |

The advantage of taking a third "look" (e.g., emitting a third ping from the UWB antenna) and receiving a third radar return from the object 830, is that the drone may be able to more accurately determine the location of the object 830 with respect to the drone. While the examples of FIG. 7 and FIG. 8 illustrate taking two and three "looks" from the UWB antenna respectively, any additional number of looks may be made to determine a more accurate location for a potential object. In an example, multiple looks may be averaged together to improve location accuracy of an object.

Figure 9:
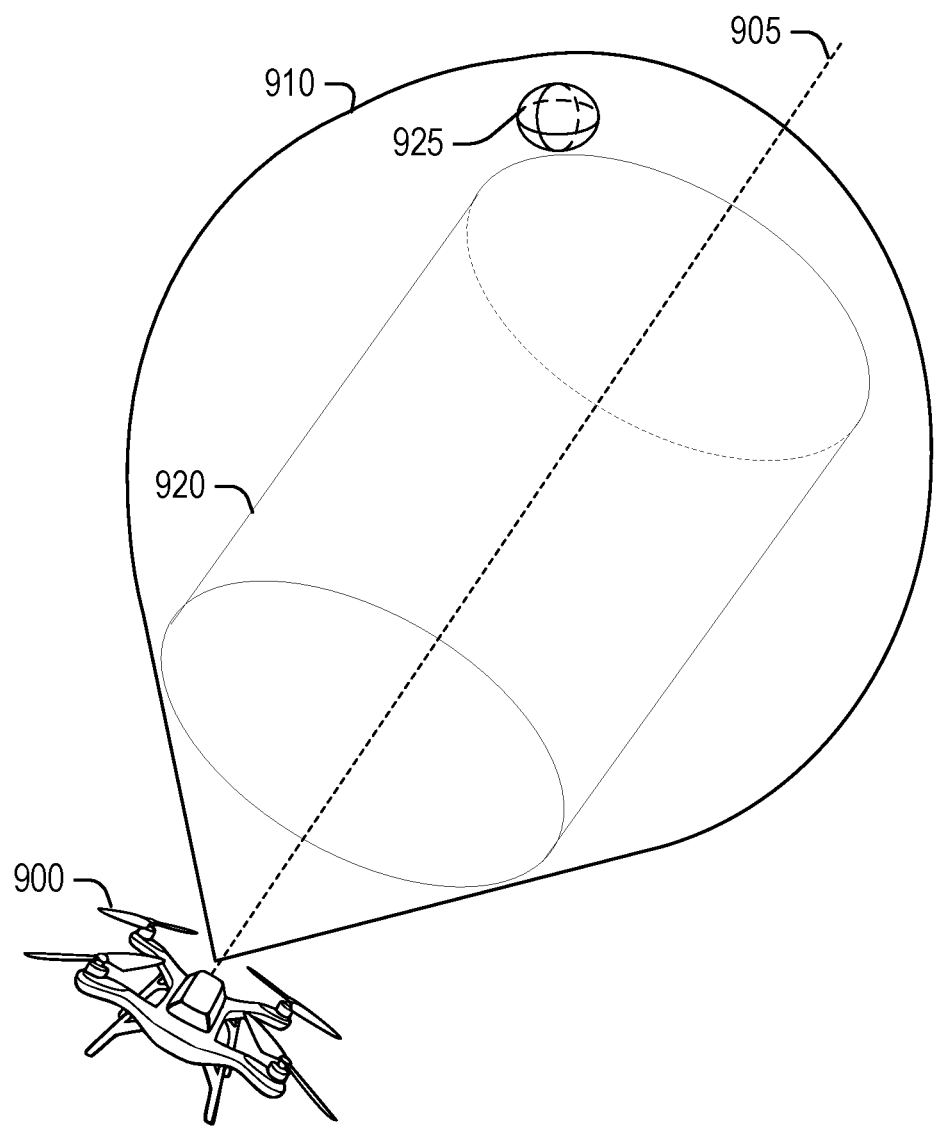
FIG. 9 illustrates a diagram showing an object located near an edge of a collision cylinder, according to some embodiments.

FIG. 9 illustrates a diagram showing an object 925 located near an edge of a collision cylinder 920, according to some embodiments. In the example shown in FIG. 9, a UWB antenna mounted on a drone 900 emits a ping resulting in an UWB radar beam 910, and receives a radar return from an object 925 located just outside the boundary of the collision cylinder 920. In such an example, the size of the object 925 may present detection issues when it falls in a location near a boundary (e.g., an edge) of the collision cylinder 920. For example, as the drone 900 moves along the trajectory 905, when the object 925 is large enough, the edge may enter the collision cylinder before a subsequent radar ping is emitted. This may cause a collision between the drone 900 and the object 925 as there may not be enough time for the drone 900 to be maneuvered (e.g., turned, sped up, slowed down, etc.) to avoid a collision. In another example, the object 925 may also be moving, and the position of the object 925 may change so as to cause it to be located within the collision cylinder 920 before a second ping may be emitted from the UWB antenna.

In such a scenario, the earliest of the radar returns from the object 925 may be used to conservatively estimate the location of the object 925. For example, the drone 900 may estimate the object 925 is within the collision cylinder 920, to trigger a collision warning which may cause the drone 900 to be maneuvered to avoid the object 925. This may ensure that the drone 900 will not "clip" or "sideswipe" the object 925 (e.g., the edge of the drone 900 impacting the object 925 as the drone moves along the trajectory 905) as they pass.

Figure 10:
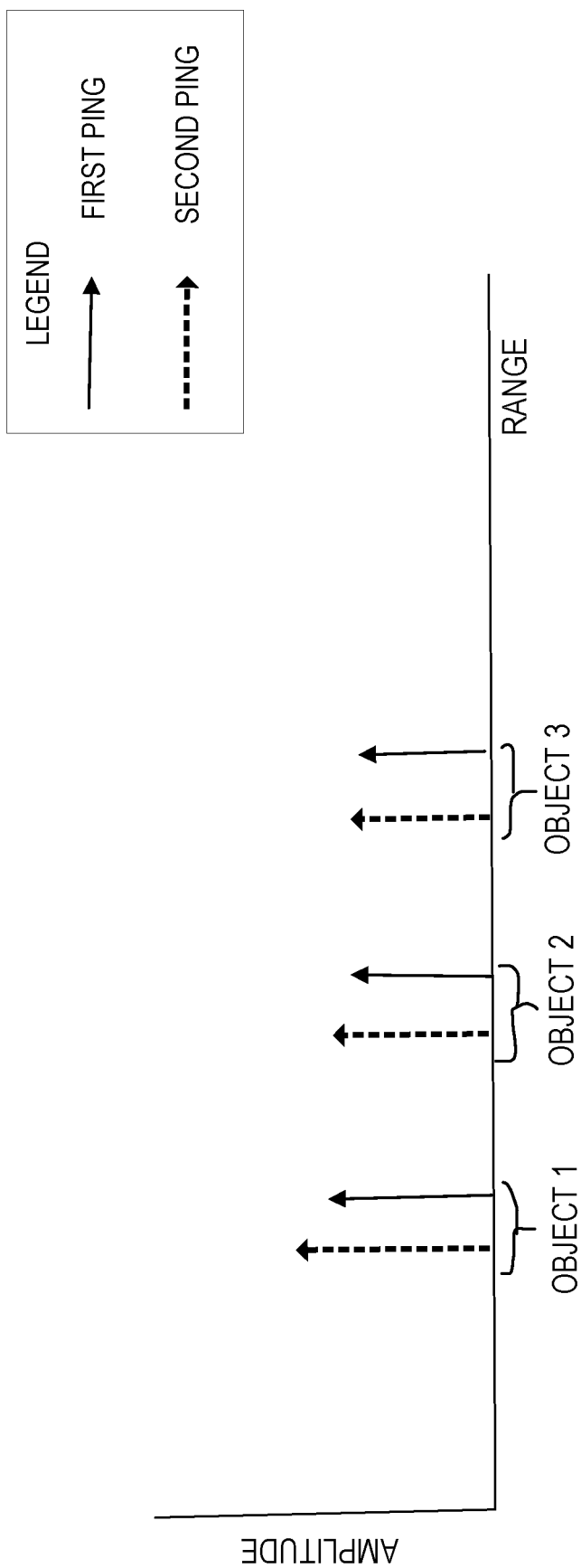
FIG. 10 illustrates a UWB radar ping graph, according to some embodiments.

FIG. 10 illustrates a UWB radar ping graph, according to some embodiments. The graph of FIG. 10 illustrates an example of received returns for multiple objects, such as in the example of FIG. 4. In such an example in which multiple objects present resolvable returns, the movement of a drone may result in echo return groupings, shown as ping 1 and ping 2, which may be grouped to identify and process multiple objects. FIG. 10 shows example returns for three objects, and the process may be applied to any number of objects. In the example of FIG. 10, grouped returns may be independently processed (e.g., the returns for a first object may be processed separately from the returns for a second or third object) to determine the likelihood of a collision with any of the individual objects. In such an example, the three objects may be stationary point objects with the drone moving toward the objects.

Figure 11:
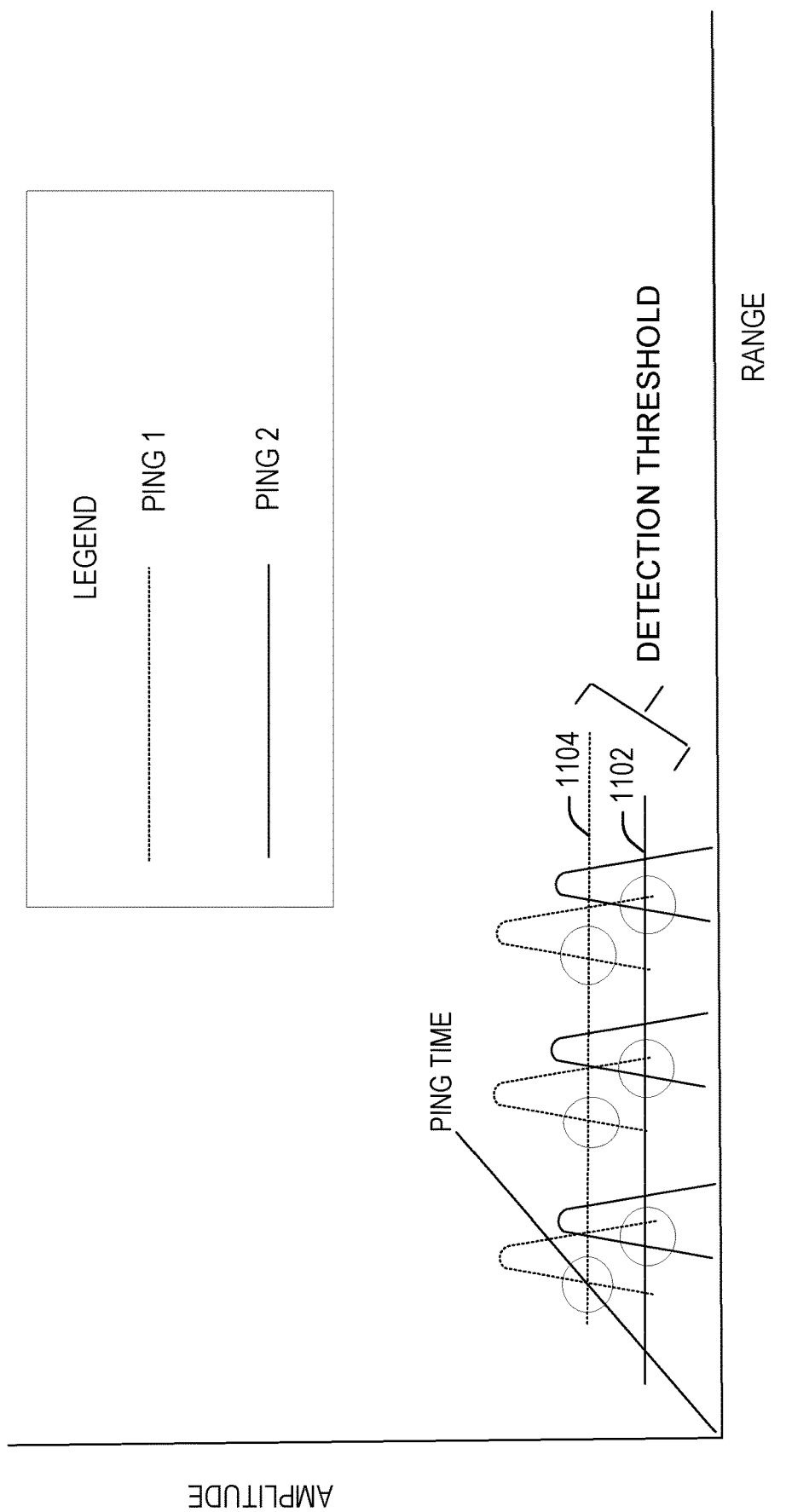
FIG. 11 illustrates a UWB radar ping graph with a detection threshold, according to some embodiments.

FIG. 11 illustrates a UWB radar ping graph with a detection threshold 1102 (and optional detection threshold 1104), according to some embodiments. FIG. 11 illustrates examples of radar returns from three range spread objects (e.g., each object is separately resolvable from radar pings). In this example, returns for each object are shown for two pings. As explained above with respect to FIG. 10, the procedure of FIG. 11 may be extended to more than three objects and more than two radar pings. When calculating a radius of an object ring for each object, the nearest discernable range measurement of an object's return echo may be used. The return echo may be smaller than the total amplitude of a particular radar return for an object.

To reduce the number of false object detections (e.g. detections caused by noise or other interfering signals) a detection threshold may be set. When the detection threshold is set too high, the number of false detections or "false alarms" returned by a radar ping may be lower, but the signal-to-noise ratio (SNR) used to meet the threshold may fail to detect valid objects. In another example, when the detection threshold is set too low valid objects may be masked within a high number of false objects. In the case of a drone traveling along a trajectory, the detection threshold and the incremental distance ΔY between the radar pings may be adaptively adjusted to achieve a range discernibility (e.g., a distance from the drone an object where the object is a potential collision threat). The detection threshold or the distance between radar pings may be adjusted, such as based on a speed the drone is traveling, an area in which the drone is navigating, or maneuverability of the drone. Circles appear in FIG. 11 to illustrate a met threshold.

Figure 12:
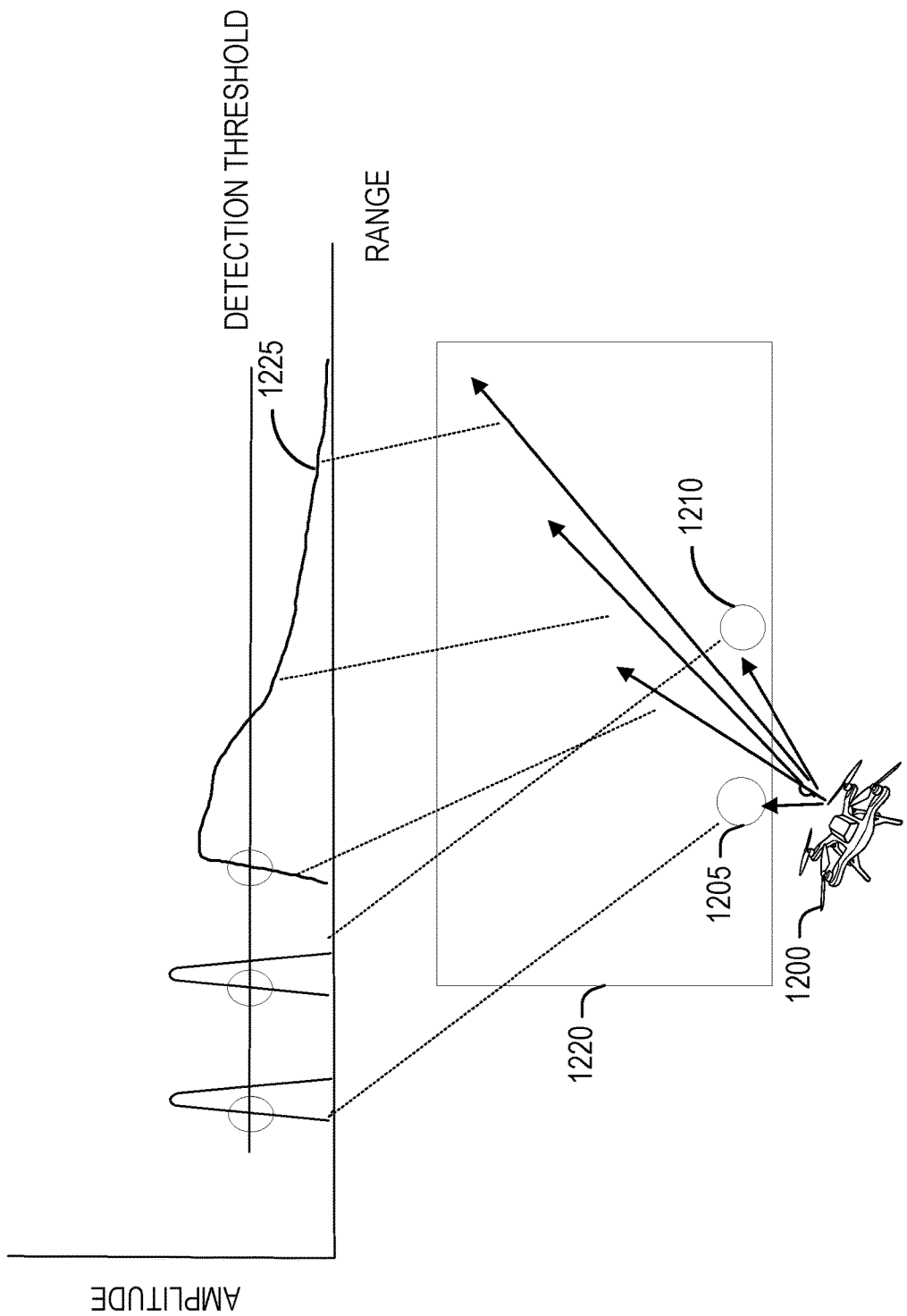
FIG. 12 illustrates a UWB radar ping graph for a large object, according to some embodiments.

FIG. 12 illustrates a UWB radar ping graph for a large object, according to some embodiments. In the example of FIG. 12, multiple objects 1205 and 1210, including a wall 1220, present potential collision threats to a drone 1200. Radar returns from the wall 1220 may be distinguished from the other objects 1205 and 1210 by a prolonged echo "tail" 1225 which may be caused by the radar signal reflecting off the larger surface presented by the wall 1220 as compared with the size of the surface presented by the other objects 1205 and 1210. The strongest return from the wall 1220 reflection may be on a boresight of the drone 1200. As described above for FIG. 11, the detection threshold and distance between radar pings may be adjusted in the scenario presented in FIG. 12 to provide a sufficient SNR and a sufficient number of pings to process objects in front of the wall 1220 such as, for example, objects 1205 and 1210. The wall 1220 of FIG. 12 is presented as an example, but other large objects (relative to the drone) may have similar tails, for example, a ceiling, ground, large object (e.g., airplane), or the like.

Figure 13:
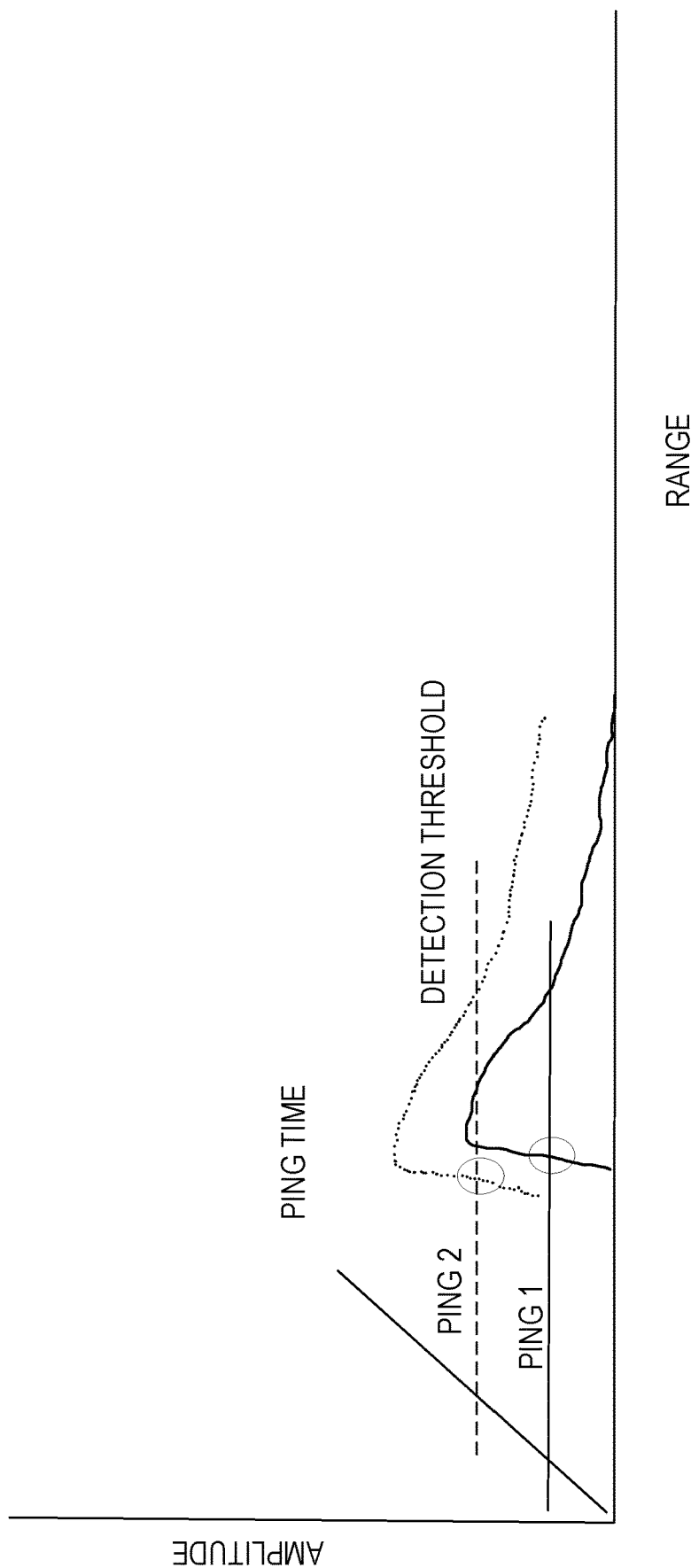
FIG. 13 illustrates a graph showing a radar ping of a wall, according to some embodiments.

FIG. 13 illustrates a graph showing a radar ping of a wall, according to some embodiments. In this example, radar returns from a wall as described for FIG. 12 may be processed by a multiple look and ping technique. Similar to the example of FIG. 11 the returns from the wall may be processed based on a nearest discernible range (e.g., the amplitude of the return that occurs just above the detection threshold, a predetermined range, etc.). Using the nearest discernible range may ensure that the drone may maneuver to avoid the entire surface of the wall. As described above with respect to FIGS. 11 and 12, the detection threshold or ping time may be adjusted.

Figure 14B:
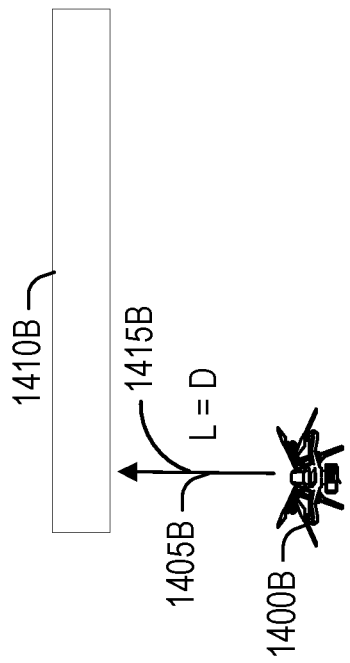
FIGS. 14A and 14B illustrate schematic diagrams showing collision distance versus actual distance from an object, according to some embodiments.
Figure 14A:
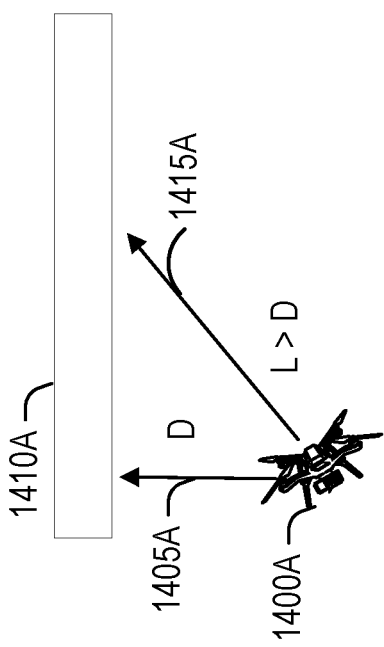

FIGS. 14A and 14B illustrate schematic diagrams showing collision distance versus actual distance from an object, according to some embodiments. In the example illustrated in FIG. 14A, a drone 1400A is traveling a shortest path distance D 1405A from a wall 1410A. In another example the drone 1400A may be traveling in a direction other than straight toward the wall, for example on a diagonal collision distance L 1415A. In such an example, the collision distance L 1415A may be larger than the shortest path distance D 1405A of the drone 1400A from the wall 1410A. In the example illustrated in FIG. 14B, the drone 1400B may be the same shortest path distance D 1405B from a wall 1410B as in the example in FIG. 14A. Because the drone 1400B is travelling directly toward the wall 1410B in FIG. 14B, the collision distance L 1415B and the shortest path distance D 1405B are the same.

In the example illustrated in FIG. 14A, the collision distance L 1415A may be used with one or more emitted pings to determine when the wall 1410A is located a distance from a defined collision cylinder (or within a collision cylinder). The drone 1400A may continue along its trajectory for as long as the wall 1410A does not present an imminent collision threat to the drone 1400A, for example based on the collision distance L 1415A, rather than relying on the apparently shorter (to the drone 1400A) shortest path distance D 1405A to the wall.

Figure 15:
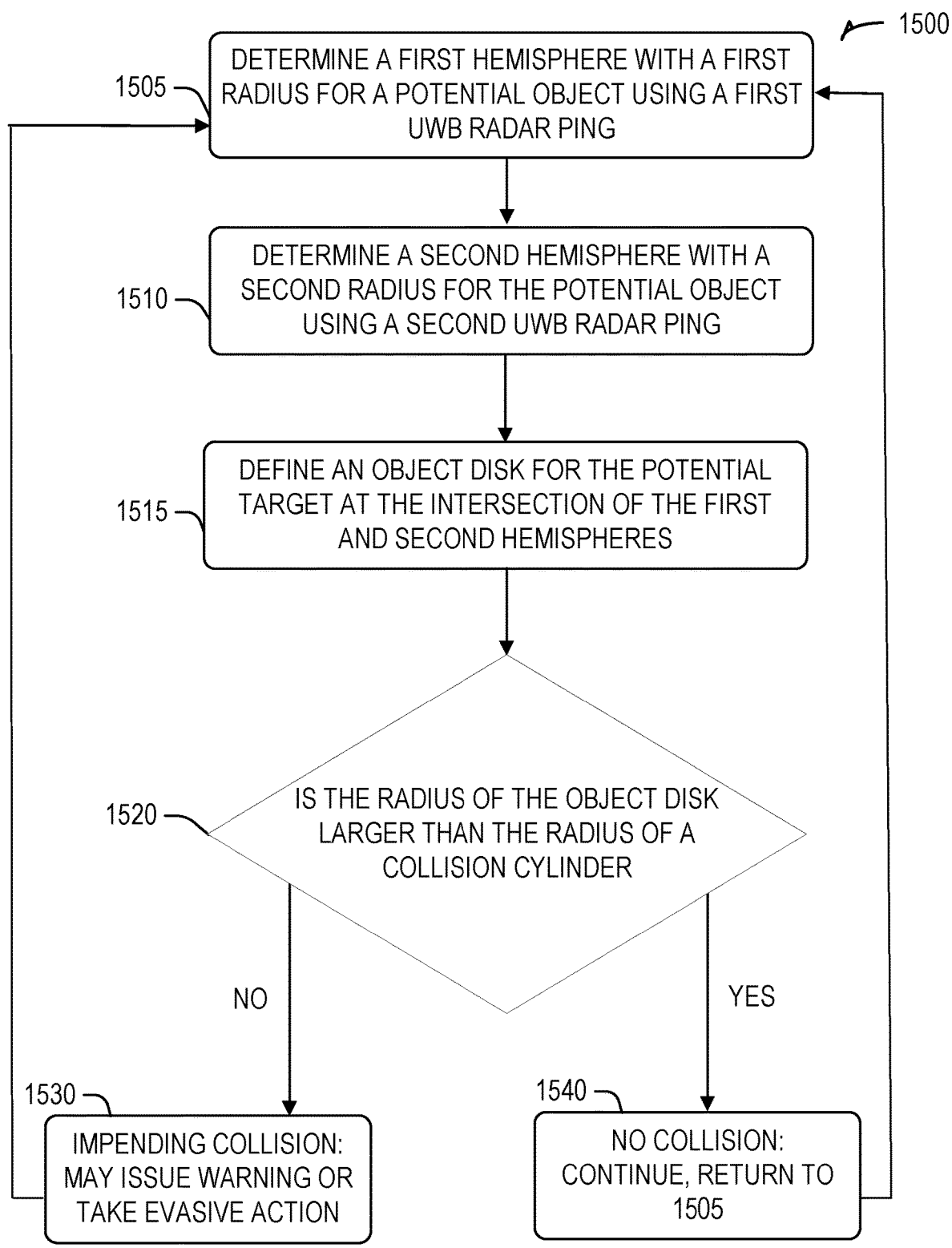
FIG. 15 illustrates a flowchart showing a technique for performing UWB collision detection, according to some embodiments.

FIG. 15 illustrates a flowchart showing a technique 1500 for performing UWB collision detection, according to some embodiments. The operations of the technique 1500 may be performed by computer hardware, such as described above or below (e.g. processing circuitry).

At operation 1505, a first hemisphere with a first radius for a potential object using a first UWB radar ping is determined. In operation 1505, an UWB radar ping may be emitted from a UWB antenna affixed to a drone. In an example, the UWB radar operates in accordance with a standard, such as the U.S. Federal Ultra-Wideband Operation standard codified in 47 C.F.R. 15, Subpart F. When a potential object is detected within the beam, a first radar return is received at a receiver (e.g., of the drone) and may be processed by a signal processor. In an example, the transmitter, receiver, or signal processor may be located on the drone, affixed to the drone, or embedded in circuitry of the drone, for example as a part of an antenna assembly. In an example, a transmit/receive device may provide a connection point to the antenna such that the transmitter and receiver may both be attached to the antenna and provide isolation between the transmitter and receiver to protect the receiver components from the transmit signal. In another example, the receiver or signal processor may be located separately from the drone.

At operation 1510, a second hemisphere with a second radius for the potential object using a second UWB radar ping is determined. The first and second pings of operations 1505 and 1510, may use a pulsed waveform (e.g. a UWB standard puled waveform), in which the radar beam is transmitted at certain intervals (e.g., a regular interval such as 0.1 s, a regular interval determined based on distance, or an irregular interval, for example more often when a potential object is identified). During the time between the pulses, the drone may have moved a distance along a trajectory. The distance moved may be defined in some examples as ΔY, which may vary or may be a same distance each time the drone moves. In another example, the pings of the radar transmitter may occur at each ΔY. In an example, the timing of the pulses, or the ΔY the drone moves between pulses may change, for example, when the drone changes speed, or when the drone detects an additional potential object in a given area. In an example, the first radar ping may define an origin of a relative coordinate system, from which the radius of the first hemisphere and the second hemisphere extends.

In the time between transmit pulses, the UWB antenna may be connected to the receiver, allowing the receiver to receive any returns reflected from potential objects. In an example, range ambiguities (e.g., a reflection of a previously transmitted pulse) may be avoided by ensuring the time between pulses is long enough to allow all echoes of interest (e.g. reflections of potential objects) to return to the receiver before the next pulse is transmitted.

At operation 1515, an object ring for each object may be defined at the intersection of the first hemisphere and the second hemisphere. The size of the object ring (e.g. the radius) may depend on the distance from the drone to the object, the velocity of the drone, or the time between radar pulses. In an example, the size of the object ring may provide an approximate location of an object with respect to the drone such that the drone may avoid colliding with the object without requiring an exact location of the object to be known. For example, the radius of the object ring may be determined via Eq. 6, which may rely on ΔY or the velocity of the drone being known. In another example, an exact location of an object may be determined by taking additional (e.g., three or more) pings from the UWB antenna. In this example, subsequent additional hemispheres may be defined, and intersect with the first hemisphere and the second hemisphere, further defining the radius of the object ring. In another example using additional pulses, the received data corresponding to each individual radar ping may be averaged, wherein the set of data may include a radius of each hemisphere, a distance moved by the drone between each ping, or the like. In an example, when multiple objects are present, an object ring may be determined by grouping the received radar returns from multiple pings.

At operation 1520, the radius of the object ring is compared to the radius of a collision cylinder for the drone (e.g., a cylinder representing a collision radius of the drone, for example extended a specified distance based on speed, maneuverability of the drone, or the like). As discussed above, the collision cylinder may be commensurate with the dimensions of the drone, slightly larger than the drone (e.g., including a buffer zone of an inch, a few inches, a foot, or a few feet). In an example, the diameter of the collision cylinder may include a distance sufficient to encompass the width of the drone. In an example, the diameter of the collision cylinder may be the exact width of the drone. In another example, the diameter of the collision cylinder may be slightly wider than the width of the drone to provide a buffer so that a potential object near the edge of the collision cylinder does not collide with an edge of the drone. The length of the collision cylinder may be commensurate with the speed the drone is traveling. For example, as the drone reduces speed, the length of the collision cylinder may be decreased, as maneuvering the drone to avoid an object may be easier at a slower speed. In another example, as the drone increases speed, the length of the collision cylinder may be increased, as the amount of time to avoid a collision with an object may be reduced.

In an example of operation 1520, the radius of the object ring may be determined as described above after a radar return identifying a potential object or objects at the receiver. The processing circuitry may determine whether a dimension of the object ring (e.g., the radius or the diameter) is larger than a dimension of the collision cylinder or collision disk (e.g., a radius or a diameter). When the dimension of the object ring is not larger than the dimension of the collision cylinder or collision disk (e.g., smaller than or equal to the dimension of the collision cylinder), the technique 1500 may proceed to operation 1530.

In operation 1530 the object lies on or within the collision cylinder or the collision disk based on the comparison of operation 1520. The object presents a threat of a collision with the drone and the technique 1500 may include issuing a warning or instructing the drone to take evasive action. In an example, the drone may be operated remotely, for example, by a human operator navigating the drone by remote control. In this example the technique 1500 may include issuing an audio warning or a visual warning at the location of the remote control, for example, a collision alarm or a warning light. In another example, an audible alarm or a warning light (e.g., a blinking light-emitting diode (LED)) may be used together to warn the drone operator that the drone is under threat of a collision.

In another example, the drone may be operated autonomously. In this example, the collision warning system may cause the processing circuitry operating the drone to take evasive action and maneuver the drone (e.g., turn, steer, increase speed, decrease speed, raise height, lower height, or the like) in such a way to avoid the identified impending or potential collision. In this example, the processing circuitry operating the drone may be located on the drone. In an alternate example, the processing circuitry operating the drone may be located separately from the drone, such as with an externally located receiver or signal processor. In this example, the technique 1500 may include returning to operation 1505 and iterating the technique 1500.

In an example, the drone may be operated remotely, such as by a human operator by remote control. In response to the impending or potential collision being identified, an autonomous system may temporarily take control of the drone to maneuver the drone (e.g., turn, steer, increase speed, decrease speed, raise height, lower height, or the like) to avoid the identified impending or potential collision. In an example, control of the drone may be returned to the operator after avoidance of the impending or potential collision is completed. In this example, an autonomous system may be able to more quickly and efficiently maneuver the drone to avoid a collision than a human operator who may, for example, have a slower reaction time.

In an example, when, at operation 1520 the system determines the radius of the object ring is larger than the radius of the collision cylinder, the technique 1500 may include an operation 1540 to determine that there is no threat of a collision. In this example, the technique 1500 may include returning to operation 1505 and iterating the technique 1500.

While the technique 1500 has been specifically described for operation of a drone, the technique 1500 may be used with a vehicle, a robotic device such as a robotic vacuum, industrial robot, or the like.

Figure 16:
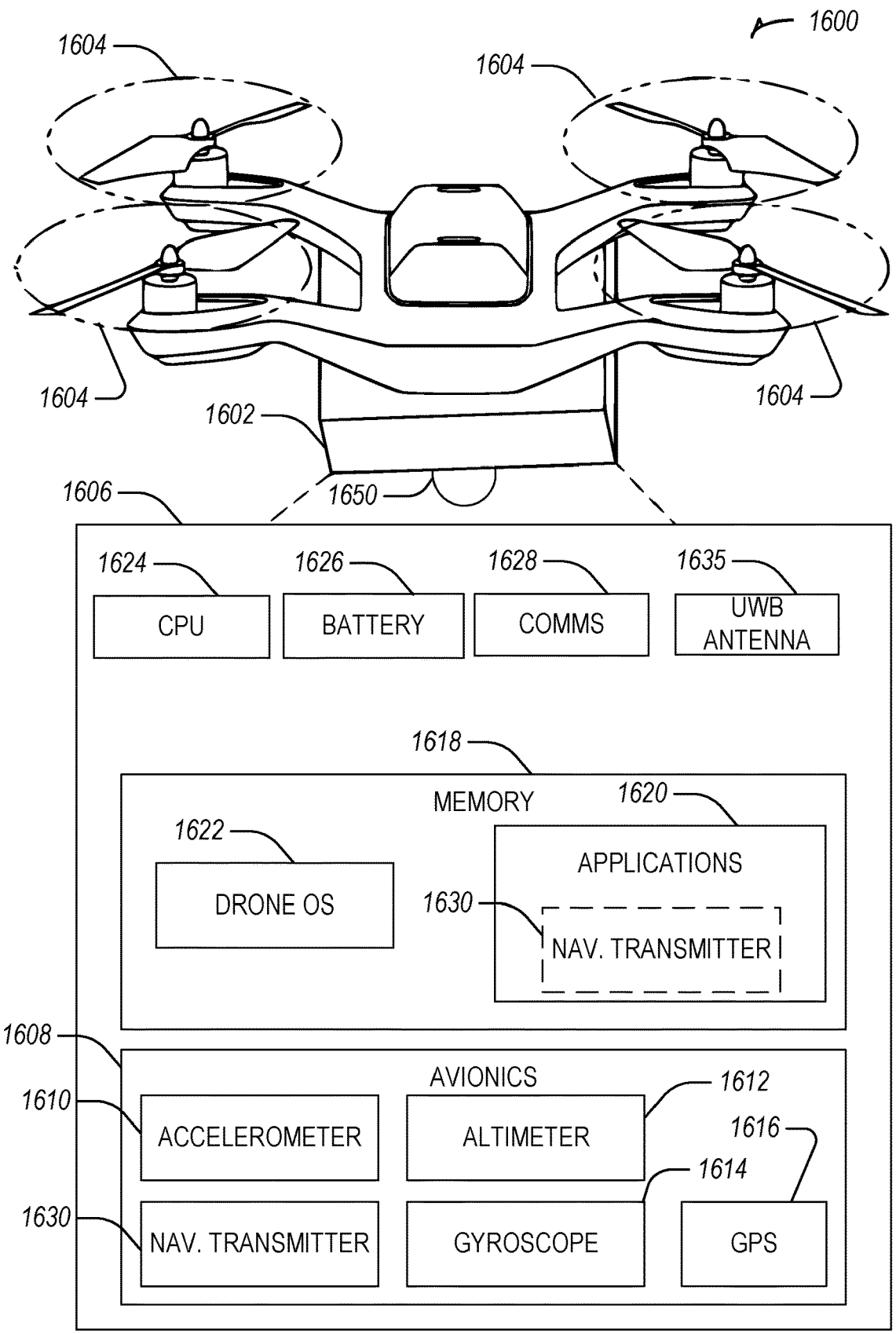
FIG. 16 illustrates an example schematic diagram of a drone, according to some embodiments.

FIG. 16 shows an example schematic of a drone 1600 in accordance with some embodiments. As shown in FIG. 16, the drone 1600 may include an airframe 1602, a flight mechanism 1604, and computing environment 1606. The airframe 1602 may be made of polymers, metals, etc. and the other components of the drone 1600 may be secured to the airframe 1602.

The flight mechanism 1604 may include mechanisms that may propel the drone 1600 through the air. For example, the flight mechanism 1604 may include propellers, rotors, turbofans, turboprops, etc. The flight mechanism 1604 may operably interface with avionics 1608. The avionics 1608 may be part of the computing environment 1606 or standalone components. For example, the avionics 1608 may include accelerometers 1610, an altimeter 1612, gyroscopes 1614, or a GPS receiver 1616.

The various components of the avionics 1608 may be standalone components or may be part of an autopilot system or other avionics package. For example, the altimeter 1612 and GPS receiver 1616 may be part of an autopilot system that includes one or more axes of control. For instance, the autopilot system may be a two-axis autopilot that may maintain a preset course and hold a preset altitude. The avionics 1608 may be used to control in-flight orientation of the drone 1600. For example, the avionics 1608 may be used to control orientation of the drone 1600 about pitch, bank, and yaw axes while in flight.

The avionics 1608 may allow for autonomous flight. For example, as described herein, the drone 1600 may receive a flightpath that the drone 1600 may fly without further user input. In addition, the avionics 1608 may include a navigation transmitter 1630 that may be used to transmit commands to the flight mechanism 1604. While FIG. 16 shows the navigation transmitter 1630 as part of the avionics 1608, the navigation transmitter 1630 may be software stored in a memory 1618 as shown by dashed navigation transmitter 1630.

The computing environment 1606 may also include the memory 1618 that may store applications 1620 and a drone operating system (OS) 1622. The applications 1620 may include lighting controls for controlling one or more LEDs 1650. The applications 1620 may include a communications program that may allow drone 1600 to communicate with a computing device. In addition, the applications 1620 may include software that functions as the navigation transmitter 1630.

The memory 1618 may provide a secure area for storage of components used to authenticate communications between the drone 1600 and the computing device. For example, the memory 1618 may store SSL certificates or other security tokens. The data stored in the memory 1618 may be read-only data such that during operation the data cannot be corrupted or otherwise altered by malware, viruses, or by other users that may try and take control of the drone 1600.

The computing environment 1606 may include a central processing unit (CPU) 1624, a battery 1626, a communications interface 1628, and a UWB antenna 1635. The UWB antenna 1635 may be a broad beam UWB antenna. The UWB antenna 1635 may be used to perform the techniques described herein, such as for performing collision avoidance for the drone 1600. The CPU 1624 may be used to execute operations and method steps, such as those described herein with regard to FIG. 15. The memory 1618 also may store data received by the drone 1600 as well as programs and other software utilized by the drone 1600. For example, the memory 1618 may store instructions that, when executed by the CPU 1624, cause the CPU 1624 to perform operations, such as causing the UWB antenna 1635 to emit the radar pings, or other such operations as those described herein.

The communications interface 1628 may include transmitters, receivers, or transceivers that may be used to communicate with the computing device. In addition, the communications interface 1628 may include a cellular interface or other wireless credential exchange circuitry. For example, the communications interface 1628 may allow the drone 1600 to transmit its position to the computing device and also allow the drone 1600 to receive the flightpaths and other data from the computing device. In an example, the communications interface 1628 may be wired directly to the CPU 1624, or the communications interface 1628 may be embedded in the CPC 1624 such as, for example, as a system on a chip, or a system in package.

In an example, the communications interface 1628 may be used for drone-to-drone, robot-to-robot, vehicle-to-vehicle or other similar machine-to-machine communication such as, for example, for collaborative collision avoidance. For example, a drone 1600 may self-identify and broadcast its position, heading, flight identification number or the like to other drones (such as other drones in a fleet of drones) to avoid an in-flight collision. This may be used in conjunction with the collision warning techniques described in this disclosure to aid in identifying objects which may present a collision risk in the flight path of the drone 1600.

While FIG. 16 shows various components of the drone 1600, not all components shown in FIG. 16 are required. For example, drone 1600 may not have the gyroscopes 1614, the altimeter 1612, etc.

In another example the drone 1600 may include a radar module (not shown). In such an example, the radar module may be physically connected to the CPU 1624 or may be integrated into the computing environment 1602 or as, for example, a system on a chip. In another example, the radar module may be part of a system in package. In an example, the radar module may include an antenna, or the antenna may be a separate unit located on, or integrated into, the body of the drone 1600.

Figure 17:
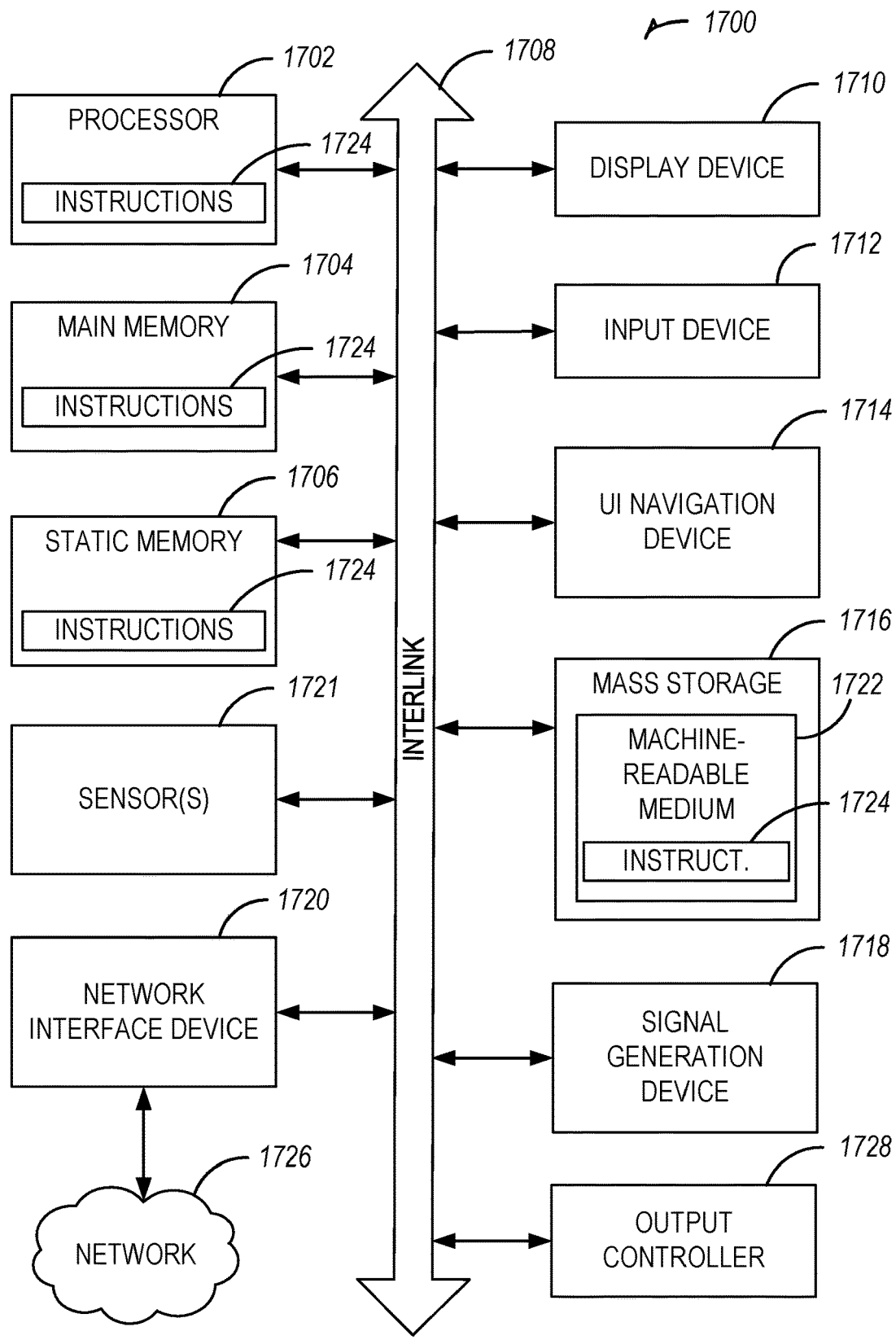
FIG. 17 illustrates generally an example of a block diagram of a machine upon which any one or more of the techniques discussed herein may perform, according to some embodiments.

FIG. 17 illustrates generally an example of a block diagram of a machine 1700 upon which any one or more of the techniques (e.g., methodologies) discussed herein may perform in accordance with some embodiments. In alternative embodiments, the machine 1700 may operate as a standalone device or may be connected (e.g., networked) to other machines. Portions or all of the machine may be incorporated into a drone, such as the drones described herein. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a personal computer (PC), a tablet PC, a drone computing device, a control system, an inertial measurement unit (IMU), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the execution's units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710, an alphanumeric input device 1712 (e.g., a keyboard), and a user interface (UI) navigation device 1714 (e.g., a mouse). In an example, the display unit 1710, alphanumeric input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1716 may include a machine readable medium 1722 that is non-transitory on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine readable medium 1722 is illustrated as a single medium, the term "machine readable medium" may include a single medium or multiple media (e.g., a centralized or distributed database, or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1720 may include one or more physical jacks (e.g., Ethernet, coaxial, or phone jacks) or one or more antennas to connect to the communications network 826. In an example, the network interface device 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software.

Each of these non-limiting examples may stand on its own or may be combined in various permutations or combinations with one or more of the other examples.

Example 1 is a system for collision warning using broad antenna pattern ultra-wide band (UWB) radar, the system comprising: an avionics controller configured to maneuver the system; a broad beam UWB antenna configured to: emit a first radar ping from the broad beam UWB antenna; receive a first return signal identifying an object; emit a second radar ping from the broad beam UWB antenna; and receive a second return signal identifying the object; and a processor subsystem configured to: determine, from the first return signal, a first hemisphere with a first radius; determine, from the second return signal, a second hemisphere with a second radius; identify an object ring for the object at an intersection of the first hemisphere and the second hemisphere; compare a radius of the object ring to a radius of a collision cylinder representing a safe distance around the system; and in accordance with a determination that the radius of the object ring is smaller than the radius of the collision cylinder, identify the object as posing a collision threat.

In Example 2, the subject matter of Example 1 includes, wherein the first radius of the first hemisphere and the second radius of the second hemisphere differ based on movement of the system or the object.

In Example 3, the subject matter of Examples 1-2 includes, wherein in response to identifying the collision threat, the processor subsystem is further configured to send an indication to the avionic controller to cause an autonomous response to maneuver the system to avoid the object.

In Example 4, the subject matter of Examples 1-3 includes, wherein the system is a drone.

In Example 5, the subject matter of Examples 1-4 includes, wherein the collision threat is identified without determining a location of the object.

In Example 6, the subject matter of Examples 1-5 includes, wherein the broad beam UWB antenna operates in accordance with 47 C.F.R. 15, Subpart F standards for ultra-wideband operation.

In Example 7, the subject matter of Examples 1-6 includes, wherein the collision cylinder includes a height, along a trajectory of a flight path of the system, based on a collision range of the system, the height determined based on a velocity of the system, and wherein the diameter of the collision cylinder is determined based on the width of the drone.

In Example 8, the subject matter of Examples 1-7 includes, wherein the processor subsystem is further configured to, in accordance with a determination that the radius of the object ring is larger than the radius of the collision cylinder, output an indication that no collision threat is posed by the object.

In Example 9, the subject matter of Examples 1-8 includes, wherein the processor subsystem is further configured to, in accordance with a determination that the radius of the object ring is smaller than the radius of the collision cylinder, output an indication of the collision threat with the object.

In Example 10, the subject matter of Examples 1-9 includes, wherein: the broad beam UWB antenna is further configured to: emit a third radar ping; receive a third return signal identifying the object; and the processor subsystem is further configured to determine, from the third return signal, a third hemisphere with a third radius for the object; and wherein to define the object ring, the processor subsystem is further configured to use the first radius, the second radius, and the third radius.

In Example 11, the subject matter of Examples 1-10 includes, wherein the first radar ping defines an origin of a relative coordinate system, from which the radius of the first hemisphere and the second hemisphere extends.

In Example 12, the subject matter of Examples 1-11 includes, wherein when more than one object is identified in response to receiving the first return signal, the processor subsystem is further configured to process an individual return signal for each of the more than one object independently to determine a likelihood of collision with the each of the more than one object.

In Example 13, the subject matter of Examples 1-12 includes, wherein when the object is detected near a boundary of the collision cylinder, the processor subsystem is further configured to calculate a location of the object using a nearest discernable range detected from the first return signal and the second return signal.

Example 14 is at least one machine-readable medium including instructions for operation of a computing system, which when executed by the machine, cause the machine to: cause emission of a first radar ping from a broad beam UWB antenna; receive a first return signal via the broad beam UWB antenna identifying an object; determine, from the first return signal, a first hemisphere with a first radius for the object; cause emission of a second radar ping from the broad beam UWB antenna; receive a second return signal via the broad beam UWB antenna identifying the object; determine, from the second return signal, a second hemisphere with a second radius for the object; define an object ring for the object at an intersection of the first hemisphere and the second hemisphere; compare a radius of the object ring to a radius of a collision cylinder representing a safe distance around the system; and in accordance with a determination that the radius of the object ring is smaller than the radius of the collision cylinder, identify the object as posing a collision threat.

In Example 15, the subject matter of Example 14 includes, wherein the instructions further cause the machine to: cause emission of a third radar ping from the UWB antenna; receive a third return signal identifying the object; determine, from the third return signal, a third hemisphere with a third radius for the object; and wherein to define the object ring, the instructions further cause the machine to use the first radius, the second radius, and the third radius.

In Example 16, the subject matter of Examples 14-15 includes, wherein the instructions further cause the machine to control, in response to identifying the collision threat, the machine to avoid the object.

In Example 17, the subject matter of Examples 14-16 includes, wherein the collision threat is identified without determining exactly where the object is located.

In Example 18, the subject matter of Examples 14-17 includes, wherein the first radar ping defines an origin of a relative coordinate system, from which the radius of the object ring extends.

In Example 19, the subject matter of Examples 14-18 includes, wherein the first radius of the first hemisphere and the second radius of the second hemisphere differ based on movement of the system or the object.

In Example 20, the subject matter of Examples 14-19 includes, wherein the machine is a drone.

In Example 21, the subject matter of Examples 14-20 includes, wherein the broad beam UWB antenna operates in accordance with 47 C.F.R. 15, Subpart F standards for ultra-wideband operation.

In Example 22, the subject matter of Examples 14-21 includes, wherein the collision cylinder includes a height, along a trajectory of a flight path of the system, based on a collision range of the system, the height determined based on a velocity of the system, and wherein the diameter of the collision cylinder is determined based on the width of the drone.

In Example 23, the subject matter of Examples 14-22 includes, wherein the processor subsystem is further configured to, in accordance with a determination that the radius of the object ring is larger than the radius of the collision cylinder, output an indication that no collision threat is posed by the object.

In Example 24, the subject matter of Examples 14-23 includes, wherein the processor subsystem is further configured to, in accordance with a determination that the radius of the object ring is smaller than the radius of the collision cylinder, output an indication of the collision threat with the object.

In Example 25, the subject matter of Examples 14-24 includes, wherein when more than one object is identified in response to receiving the first return signal, the processor subsystem is further configured to process an individual return signal for each of the more than one object independently to determine a likelihood of collision with the each of the more than one object.

In Example 26, the subject matter of Examples 14-25 includes, wherein when the object is detected near a boundary of the collision cylinder, the processor subsystem is further configured to calculate a location of the object using a nearest discernable range detected from the first return signal and the second return signal.

Example 27 is a method of collision warning using broad antenna pattern ultra-wide band (UWB) radar, the method comprising: emitting a first radar ping from a broad beam UWB antenna; receiving a first return signal identifying an object; determining, from the first return signal, a first hemisphere with a first radius for the object; emitting a second radar ping from the broad beam UWB antenna; receiving a second return signal identifying the object; determining, from the second return signal, a second hemisphere with a second radius for the object; defining an object ring for the object at an intersection of the first hemisphere and the second hemisphere; comparing a radius of the object ring to a radius of a collision cylinder representing a safe distance around the system; and identifying, in accordance with a determination that the radius of the object ring is smaller than the radius of the collision cylinder, the object as posing a collision threat.

In Example 28, the subject matter of Example 27 includes, processing, when more than one object is identified in response to receiving the first return signal, an individual return signal for each of the more than one object independently to determine a likelihood of collision with the each of the more than one object.

In Example 29, the subject matter of Examples 27-28 includes, calculating, when the object is detected near a boundary of the collision cylinder, a location of the object using a nearest discernable range detected from the first return signal and the second return signal.

In Example 30, the subject matter of Examples 27-29 includes, outputting, in accordance with a determination that the radius of the object ring is smaller than the radius of the collision cylinder, an indication of the collision threat with the object.

In Example 31, the subject matter of Examples 27-30 includes, emitting a third radar ping; receiving a third return signal identifying the object; determining, from the third return signal, a third hemisphere with a third radius for the object; and wherein defining the object ring includes using the first radius, the second radius, and the third radius.

In Example 32, the subject matter of Examples 27-31 includes, wherein the collision cylinder includes a height, along a trajectory of a flight path of the system, based on a collision range of the system, the height determined based on a velocity of the system, and wherein the diameter of the collision cylinder is determined based on the width of the drone.

In Example 33, the subject matter of Examples 27-32 includes, wherein the first radius of the first hemisphere and the second radius of the second hemisphere differ based on movement of the system or the object.

In Example 34, the subject matter of Examples 27-33 includes, in response to identifying the collision threat, sending an indication to the avionic controller to cause an autonomous response to maneuver the system to avoid the object.

In Example 35, the subject matter of Examples 27-34 includes, wherein the collision threat is identified without determining a location of the object.

In Example 36, the subject matter of Examples 27-35 includes, wherein the broad beam UWB antenna operates in accordance with 47 C.F.R. 15, Subpart F standards for ultra-wideband operation.

In Example 37, the subject matter of Examples 27-36 includes, in accordance with a determination that the radius of the object ring is larger than the radius of the collision cylinder, outputting an indication that no collision threat is posed by the object.

In Example 38, the subject matter of Examples 27-37 includes, wherein the first radar ping defines an origin of a relative coordinate system, from which the radius of the first hemisphere and the second hemisphere extends.

Example 39 is at least one machine-readable medium including instructions for operation of a computing system, which when executed by a machine, cause the machine to perform operations of any of the methods of Examples 27-38.

Example 40 is an apparatus comprising means for performing any of the methods of Examples 27-38.

Example 41 is an apparatus for collision warning using broad antenna pattern ultra-wide band (UWB) radar, the device comprising: means for emitting a first radar ping from a broad beam UWB antenna; means for receiving a first return signal identifying an object; means for determining, from the first return signal, a first hemisphere with a first radius for the object; means for emitting a second radar ping from the broad beam UWB antenna; means for receiving a second return signal identifying the object; means for determining, from the second return signal, a second hemisphere with a second radius for the object; means for defining an object ring for the object at an intersection of the first hemisphere and the second hemisphere; means for comparing a radius of the object ring to a radius of a collision cylinder representing a safe distance around the system; and means for identifying, in accordance with a determination that the radius of the object ring is smaller than the radius of the collision cylinder, the object as posing a collision threat.

In Example 42, the subject matter of Example 41 includes, means for processing, when more than one object is identified in response to receiving the first return signal, an individual return signal for each of the more than one object independently to determine a likelihood of collision with the each of the more than one object.

In Example 43, the subject matter of Examples 41-42 includes, means for calculating, when the object is detected near a boundary of the collision cylinder, a location of the object using a nearest discernable range detected from the first return signal and the second return signal.

In Example 44, the subject matter of Examples 41-43 includes, means for outputting, in accordance with a determination that the radius of the object ring is smaller than the radius of the collision cylinder, an indication of the collision threat with the object.

In Example 45, the subject matter of Examples 41-44 includes, means for emitting a third radar ping; means for receiving a third return signal identifying the object; means for determining, from the third return signal, a third hemisphere with a third radius for the object; and wherein defining the object ring includes using the first radius, the second radius, and the third radius.

In Example 46, the subject matter of Examples 41-45 includes, wherein the collision cylinder includes a height, along a trajectory of a flight path of the system, based on a collision range of the system, the height determined based on a velocity of the system, and wherein the diameter of the collision cylinder is determined based on the width of the drone.

In Example 47, the subject matter of Examples 41-46 includes, wherein the first radius of the first hemisphere and the second radius of the second hemisphere differ based on movement of the system or the object.

In Example 48, the subject matter of Examples 41-47 includes, in response to identifying the collision threat, means for sending an indication to the avionic controller to cause an autonomous response to maneuver the system to avoid the object.

In Example 49, the subject matter of Examples 41-48 includes, wherein the collision threat is identified without determining a location of the object.

In Example 50, the subject matter of Examples 41-49 includes, wherein the broad beam UWB antenna operates in accordance with 47 C.F.R. 15, Subpart F standards for ultra-wideband operation.

In Example 51, the subject matter of Examples 41-50 includes, in accordance with a determination that the radius of the object ring is larger than the radius of the collision cylinder, means for outputting an indication that no collision threat is posed by the object.

In Example 52, the subject matter of Examples 41-51 includes, wherein the first radar ping defines an origin of a relative coordinate system, from which the radius of the first hemisphere and the second hemisphere extends.

Example 53 is at least one machine-readable medium including instructions that, when executed by processing circuitry, cause the processing circuitry to perform operations to implement of any of Examples 1-52.

Example 54 is an apparatus comprising means to implement of any of Examples 1-52.

Example 55 is a system to implement of any of Examples 1-52.

Example 56 is a method to implement of any of Examples 1-52.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for collision warning using broad antenna pattern ultra-wide band (UWB) radar, the system comprising:
   an avionics controller configured to autonomously maneuver the system;
   a broad beam UWB hardware antenna configured to:
      emit a first radar ping from the broad beam UWB hardware antenna;
      receive a first return signal identifying an object;

emit a second radar ping from the broad beam UWB hardware antenna; and
receive a second return signal identifying the object; and processing circuitry configured to:
determine, from the first return signal, a first hemisphere with a first radius;
determine, from the second return signal, a second hemisphere with a second radius;
identify an object ring for the object;
compare a radius of the object ring to a radius of a collision cylinder representing a safe distance around the system; and
in accordance with a determination that the radius of the object ring is smaller than the radius of the collision cylinder, identify the object as posing a collision threat.

2. The system of claim 1, wherein the first radius of the first hemisphere and the second radius of the second hemisphere differ based on movement of the system or the object.

3. The system of claim 1, wherein in response to identifying the collision threat, the processing circuitry is further configured to send an indication to the avionics controller to cause an autonomous response to maneuver the system to avoid the object.

4. The system of claim 1, wherein the system is a drone.

5. The system of claim 4, wherein the collision cylinder includes a height, along a trajectory of a flight path of the system, based on a collision range of the system, the height determined based on a velocity of the system, and wherein a diameter of the collision cylinder is determined based on a width of the drone.

6. The system of claim 1, wherein the collision threat is identified without determining a location of the object.

7. The system of claim 1, wherein the broad beam UWB hardware antenna operates in accordance with 47 C.F.R. 15, Subpart F standards for ultra-wideband operation.

8. The system of claim 1, wherein the processing circuitry is further configured to, in accordance with a determination that the radius of the object ring is larger than the radius of the collision cylinder, output an indication that no collision threat is posed by the object.

9. The system of claim 1, wherein the processing circuitry is further configured to, in response to the determination that the radius of the object ring is smaller than the radius of the collision cylinder, output an indication of the collision threat with the object.

10. The system of claim 1, wherein:
the broad beam UWB hardware antenna is further configured to:
emit a third radar ping;
receive a third return signal identifying the object; and
the processing circuitry is further configured to determine, from the third return signal, a third hemisphere with a third radius for the object; and
wherein to define the object ring, the processing circuitry is further configured to use the first radius, the second radius, and the third radius.

11. The system of claim 1, wherein the first radar ping defines an origin of a relative coordinate system, from which the first radius of the first hemisphere and the second radius of the second hemisphere extends.

12. The system of claim 1, wherein when more than one object is identified in response to receiving the first return signal, the processing circuitry is further configured to process an individual return signal for each individual object of the more than one object independently to determine a likelihood of collision with each individual object of the more than one object.

13. The system of claim 1, wherein when the object is detected within a threshold distance from a boundary of the collision cylinder, the processing circuitry is further configured to calculate a location of the object using a nearest discernable range detected from the first return signal and the second return signal, wherein the nearest discernable range is an amplitude of the first return signal and the second return signal above a detection threshold.

14. At least one non-transitory machine-readable medium including instructions for operation of a computing system, which when executed by the computing system, cause the computing system to:
cause emission of a first radar ping from a broad beam UWB hardware antenna;
receive a first return signal via the broad beam UWB hardware antenna identifying an object;
determine, from the first return signal, a first hemisphere with a first radius for the object;
cause emission of a second radar ping from the broad beam UWB hardware antenna;
receive a second return signal via the broad beam UWB hardware antenna identifying the object;
determine, from the second return signal, a second hemisphere with a second radius for the object;
define an object ring for the object;
compare a radius of the object ring to a radius of a collision cylinder representing a safe distance around a system to which the UWB hardware antenna is connected; and
in accordance with a determination that the radius of the object ring is smaller than the radius of the collision cylinder, identify the object as posing a collision threat.

15. The at least one machine-readable medium of claim 14, wherein the instructions further cause the computing system to:
cause emission of a third radar ping from the UWB hardware antenna;
receive a third return signal identifying the object;
determine, from the third return signal, a third hemisphere with a third radius for the object; and
wherein to define the object ring, the instructions further cause the machine to use the first radius, the second radius, and the third radius.

16. The at least one machine-readable medium of claim 14 wherein the instructions further cause the computing system to control, in response to identifying the collision threat, the machine to avoid the object.

17. The at least one machine-readable medium of claim 14 wherein the collision threat is identified without determining a location of the object.

18. The at least one machine-readable medium of claim 14 wherein the first radar ping defines an origin of a relative coordinate system, from which the radius of the object ring extends.

19. A method of collision warning using broad antenna pattern ultra-wide band (UWB) radar, the method comprising:
emitting a first radar ping from a broad beam UWB hardware antenna;
receiving a first return signal identifying an object;
determining, from the first return signal, a first hemisphere with a first radius for the object;
emitting a second radar ping from the broad beam UWB hardware antenna;

receiving a second return signal identifying the object;
determining, from the second return signal, a second hemisphere with a second radius for the object;
defining an object ring for the object;
comparing a radius of the object ring to a radius of a collision cylinder representing a safe distance around a system to which the UWB hardware antenna is attached; and
identifying, in accordance with a determination that the radius of the object ring is smaller than the radius of the collision cylinder, the object as posing a collision threat.

20. The method of claim 19, further comprising processing, when more than one object is identified in response to receiving the first return signal, an individual return signal for each of the more than one object independently to determine a likelihood of collision with the each of the more than one object.

21. The method of claim 19, further comprising calculating, when the object is detected within a threshold distance from a boundary of the collision cylinder, a location of the object using a nearest discernable range detected from the first return signal and the second return signal, wherein the nearest discernable range is an amplitude of the first return signal and the second return signal above a detection threshold.

22. The method of claim 19, further comprising outputting, in accordance with the determination that the radius of the object ring is smaller than the radius of the collision cylinder, an indication of the collision threat with the object.

23. The method of claim 19, further comprising:
emitting a third radar ping;
receiving a third return signal identifying the object;
determining, from the third return signal, a third hemisphere with a third radius for the object; and
wherein defining the object ring includes using the first radius, the second radius, and the third radius.

24. The method of claim 19, further comprising adjusting an amount of time between the first radar ping and the second radar ping based on a speed of an object to which the UWB hardware antenna is affixed.

25. The method of claim 19, wherein the first radar ping defines an origin of a relative coordinate system, from which the first radius of the first hemisphere and the second radius of the second hemisphere extends.

* * * * *